(12) United States Patent
Dandra et al.

(10) Patent No.: US 11,968,562 B2
(45) Date of Patent: Apr. 23, 2024

(54) METHOD AND UE FOR ENHANCING NAS SIGNALING IN RADIO CAPABILITY SIGNALING OPTIMIZATION

(71) Applicant: SAMSUNG ELECTRONICS CO., LTD., Suwon-si (KR)

(72) Inventors: Prasad Basavaraj Dandra, Bangalore (IN); Shrinithi Andal Tensingh, Bangalore (IN); Umasankar Ceendhralu Baskar, Bangalore (IN); Vijay Ganesh Surisetty, Bangalore (IN); Chetan Ramesh Ganig, Bangalore (IN); Lalith Kumar, Bangalore (IN)

(73) Assignee: Samsung Electronics Co., Ltd. (KR)

( * ) Notice: Subject to any disclaimer, the term of this patent is extended or adjusted under 35 U.S.C. 154(b) by 52 days.

(21) Appl. No.: 17/398,053

(22) Filed: Aug. 10, 2021

(65) Prior Publication Data

US 2022/0046470 A1  Feb. 10, 2022

(30) Foreign Application Priority Data

Aug. 10, 2020 (IN) .............................. 202041034334
Aug. 9, 2021 (IN) .............................. 202041034334

(51) Int. Cl.
*H04W 28/06* (2009.01)
*H04W 60/00* (2009.01)

(52) U.S. Cl.
CPC .......... *H04W 28/06* (2013.01); *H04W 60/00* (2013.01)

(58) Field of Classification Search
CPC ....... H04W 28/06; H04W 60/00; H04W 8/24; H04W 8/22; H04W 60/04; H04W 4/20; H04W 76/27; H04W 76/38
See application file for complete search history.

(56) References Cited

U.S. PATENT DOCUMENTS

| 10,257,078 B2 | 4/2019 | Faccin et al. | |
|---|---|---|---|
| 2013/0208699 A1* | 8/2013 | Hakkinen | H04W 76/38 370/331 |
| 2014/0355417 A1* | 12/2014 | Kim | H04W 24/04 370/221 |
| 2019/0306823 A1* | 10/2019 | Babu | H04W 60/04 |
| 2019/0313239 A1 | 10/2019 | Horn et al. | |

(Continued)

FOREIGN PATENT DOCUMENTS

| CN | 111182563 A | 5/2020 | |
|---|---|---|---|
| EP | 4033796 A1 * | 7/2022 | .......... H04L 5/0053 |

(Continued)

OTHER PUBLICATIONS

3GPP TS 24.501 Release 16, Aug. 2020 (Year: 2020).*

*Primary Examiner* — Yuwen Pan
*Assistant Examiner* — Swati Jain
(74) *Attorney, Agent, or Firm* — Fish & Richardson P.C.

(57) ABSTRACT

NAS signaling between a UE and a server is enhanced by performing one of: sending a registration complete message to the server using existing NAS signaling and without starting a release timer in response to receiving an RC_ID deletion IE in a registration accept message; and not sending the registration complete message to the server in response to receiving the RC_ID deletion IE in the registration accept message. A registration procedure is reinstated based on a stored RC_ID.

18 Claims, 19 Drawing Sheets

(56) References Cited

U.S. PATENT DOCUMENTS

| | | | |
|---|---|---|---|
| 2020/0077356 A1* | 3/2020 | Youn | H04W 68/02 |
| 2020/0396000 A1* | 12/2020 | Ryu | H04W 48/00 |
| 2021/0051621 A1* | 2/2021 | Tiwari | H04W 12/08 |
| 2021/0153037 A1* | 5/2021 | Ke | H04W 28/0215 |
| 2021/0360567 A1* | 11/2021 | Tiwari | H04W 76/25 |
| 2021/0360569 A1* | 11/2021 | Park | H04W 28/0289 |
| 2022/0030538 A1* | 1/2022 | Tiwari | H04W 60/00 |
| 2022/0272651 A1* | 8/2022 | Chun | H04W 60/04 |
| 2022/0408395 A1* | 12/2022 | Li | H04W 8/02 |

FOREIGN PATENT DOCUMENTS

| | | | | |
|---|---|---|---|---|
| WO | WO-2020003576 A1 | * | 1/2020 | H04W 12/08 |
| WO | 2020024972 A1 | | 2/2020 | |

* cited by examiner

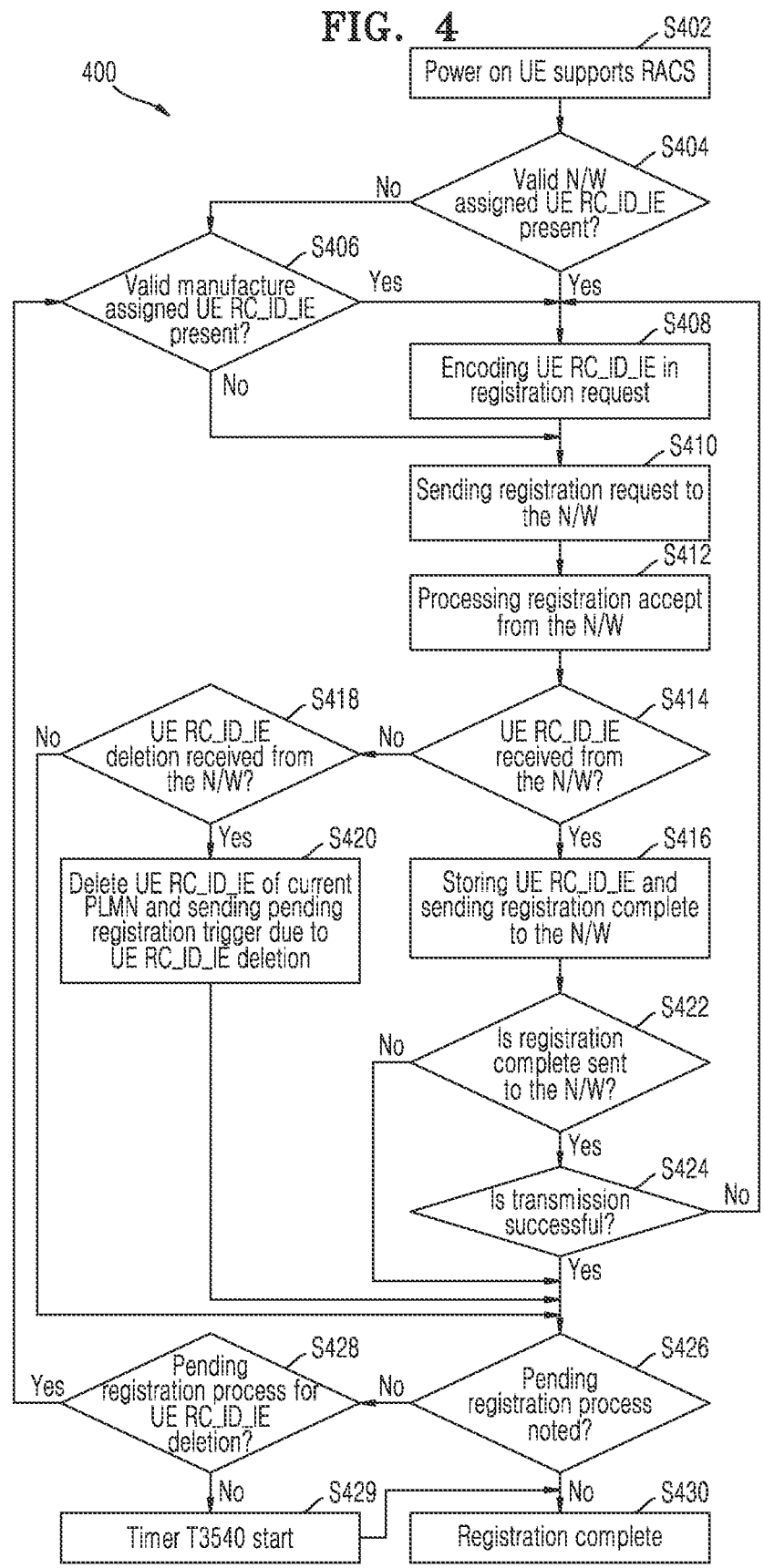

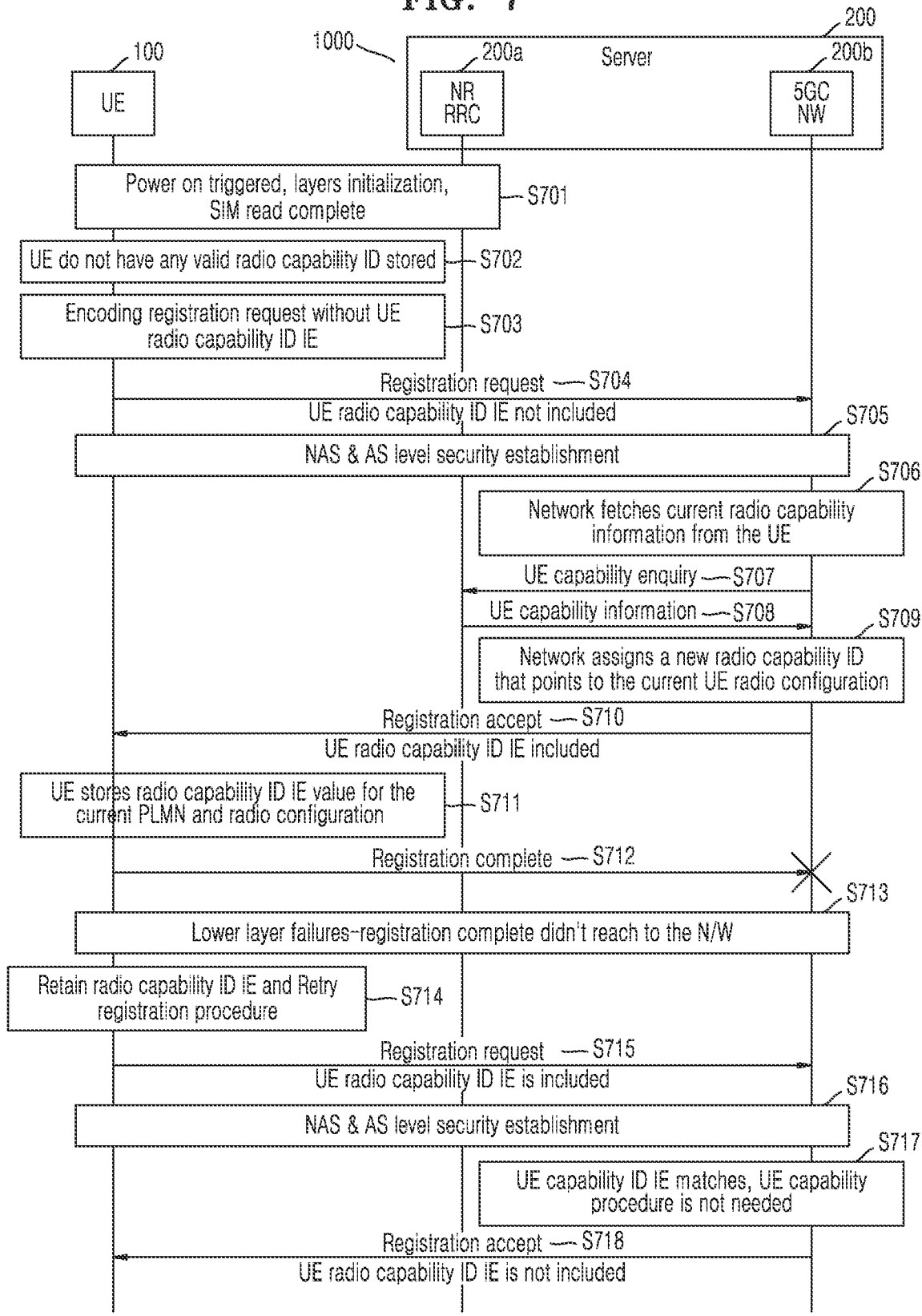

METHOD AND UE FOR ENHANCING NAS SIGNALING IN RADIO CAPABILITY SIGNALING OPTIMIZATION

CROSS-REFERENCE TO THE RELATED APPLICATION

This U.S. non-provisional patent application claims priority under 35 U.S.C. § 119 to Indian Provisional Patent Application No. 202041034334, filed on Aug. 10, 2020, in the Indian Intellectual Property Office and Indian Patent Application No. 2020410234334, filed on Aug. 9, 2021, in the Indial Intellectual Property Office, the disclosure of which is incorporated herein by reference in its entirety.

FIELD

The present disclosure relates to NAS (Non-Access Stratum) signaling, and more specifically, relates to a method and UE (user equipment) for enhancing the NAS signaling in UE RACS (UE radio capability signaling optimization) of a wireless network.

BACKGROUND

In the current 3GPP specification (3$^{rd}$ Generation Partnership Project specification), an estimated theoretical maximum size of UE radio capabilities for NR (New Radio) or EN-DC (E-UTRAN New Radio-Dual Connectivity) is approximately 10000 Kbytes based on maximum sizes in an ASN.1 (Abstract Syntax Notation One). But according to experience with and analysis of LTE (Long-Term Evolution) and NR, estimated practical size of RF (Radio Frequency) parameters (e.g. UE radio capabilities) is approximately 11-12 Kbytes, based on ~1024 band combinations and up to 4 bands per band combination, during a registration procedure.

FIG. 1A is an example scenario illustrating the registration procedure of the UE without using the UE RACS in a wireless network (e.g. server, LTE, NR, EN-DC, etc.), according to prior art. The wireless network comprises a plurality of (TAIs) Tracking Area Identities). At S1a, the UE in a TAI-1 sends a registration request to the wireless network. At S2a, the UE in the TAI-1 receives a capability request from the wireless network. At S3a, the UE sends capability information (e.g. LTE) to the wireless network on the TAI-1 in response to receiving the capability request. At S4a, the UE receives a registration response from the wireless network as part of the registration procedure. Now, consider a scenario in which the UE moves into a new location/area such as TAI-2. In that scenario, the UE must perform a registration request procedure with mobility update and repeats the signaling process (S5a-S8a) on a TAI-2, which results in increased signaling overhead in the wireless network. Therefore, RACS has been introduced to optimize the transmissions of the UE radio capabilities.

RACS is a feature designed to optimize the transmission of the increasing size of UE radio capabilities over a radio interface related to AS (access stratum) signaling messages interchanged with the wireless network. The AS is a functional layer in some (e.g., LTE) wireless telecommunication protocols between the UE and the wireless network. RACS works by assigning an identifier (i.e., radio capability ID/RC_ID) to represent a set of UE radio capabilities. The RC_ID is used as an alternative to AS capability signalling messages. A value of the RC_ID can be assigned by a manufacturer or by the wireless network. The manufacturer-assigned RC_ID is either preconfigured or is sent by the manufacturer through an Open Mobile Alliance (OMA) Device Management (DM), applies only to current UE radio configurations, and is usable in all PLMNs (Public Land Mobile Networks).

FIG. 1B is an example scenario illustrating a registration procedure of the UE using the UE RACS in the wireless network, according to prior art. At S1b, the UE in a TAI-1 sends a registration request to the wireless network. At S2b, the UE in the TAI-1 receives a capability request from the wireless network. At S3b, the UE sends capability information to the wireless network on the TAI-1 in response to receiving the capability request. At S4b, the UE receives an RC_ID-1 (in a registration response) from the wireless network in the TAI-1 in response to sending the capability information. The RC_ID-1 is applicable only in the serving PLMN/a Stand-alone Non-Public Network (SNPN) and for the current radio capability configuration of the UE when the RC_ID was assigned. At S5b-S6b, consider a scenario in which the UE moves into the new location/area such as TAI-2. In that scenario, the UE does not perform the UE capability signaling in the TAI-2, since the UE has an applicable RC_ID-1 (to be used in a subsequent registration request) for the current PLMN/SNPN and radio capabilities combination. The RC_ID-1 will be used instead of RRC UE radio capability transfer procedure in the TAI-2 to indicate UE radio access capability information from the UE to the wireless network, which results in decreased signaling overhead in the wireless network.

As per specifications 3GPP TS 23.501, TS 24.501, and TS 24.301, conventional RACS features/procedures are inefficient due to improper signaling conditions. For example, a. Initiating a timer T3540 as per conditions defined in 3GPP 24.501 section 5.3.1.3 V16.5.1 for releasing an NAS signaling connection after receiving a registration accept message with UE radio capability deletion indication Information Element (IE) from the wireless network, which causes an additional delay of 10 seconds in a registration procedure performed after deletion of the UE RC_IDs and an unnecessary overhead on the UE to wait for an already established RRC connection to break or be released.

b. Sending a registration complete message as an acknowledgement to the wireless network after receiving the registration accept message with UE radio capability deletion indication IE from the wireless network, which causes signaling overhead in both the UE and the wireless network.

c. After receiving a new UE RC_ID in the registration accept message, it is unclear whether the UE can continue to use this newly received ID in case of a transmission failure of the registration complete message.

d. After receiving a UE RC_ID in the registration accept message for the current PLMN, the UE and the wireless network will negotiate the radio capability identity again after moving to new PLMN or TAC (tracking area code) even when the new PLMN or TAC belongs to the same Access and Mobility Management Function (AMF)/Mobility Management Entity (MME).

Detailed explanations of the improper signaling conditions associated with the conventional RACS features/procedures are provided with respect to FIG. 2A to FIG. 2H. The conventional RACS features/procedures lead to NAS signaling overhead, delay in the NAS signaling, and wastage of radio resources in the NAS signaling. There is scope to improve efficiency in RACS procedures/management and negotiation between the UE and the wireless network in certain scenarios of the NAS signaling. Thus, it is desired to at least provide a useful alternative for RACS procedures/management and the NAS signaling.

SUMMARY

Embodiments described herein provide a method for enhancing NAS signaling in a UE RACS in a wireless network. The method includes receiving, by a UE, an RC_ID_IE (radio capability identity information element) from a server of the wireless network to optimize a transmission of the UE. Further, the method includes sending, by the UE, a registration request message to the server to establish NAS signaling between the UE and the server. Further, the method includes establishing, by the UE, the NAS signaling between the UE and the server. Further, the method includes enhancing, by the UE, the NAS signaling between the UE and the server by performing one of: (a) receiving a registration accept message with an RC_ID deletion IE from the server, and sending a registration complete message to the server using existing NAS signaling and without starting a release timer in response to receiving the RC_ID deletion IE in the registration accept message; and (b) receiving the registration accept message with the RC_ID deletion IE from the server and not sending the registration complete message to the server in response to receiving the RC_ID deletion IE in the registration accept message.

Embodiments described herein provide a UE for enhancing NAS signaling in a UE RACS in a wireless network. The UE includes an NAS signaling controller operably connected to a processor and a memory. The NAS signaling controller is configured to receive an RC_ID_IE with an RC_ID from a server of the wireless network to optimize a transmission of the UE. Further, the NAS signaling controller is configured to send a registration request message to the server to establish NAS signaling between the UE and the server. Further, the NAS signaling controller is configured to establish the NAS signaling between the UE and the server. Further, the NAS signaling controller is configured to enhance the NAS signaling between the UE and the server by performing one of: (a) receiving a registration accept message with an RC_ID deletion IE from the server, and sending a registration complete message to the server using existing NAS signaling and without starting a release timer in response to receiving the RC_ID deletion IE in the registration accept message; and (b) receiving the registration accept message with the RC_ID deletion IE from the server and not sending the registration complete message to the server in response to receiving the RC_ID deletion IE in the registration accept message.

These and other aspects of the embodiments herein will be better appreciated and understood when considered in conjunction with the following description and the accompanying drawings. It should be understood, however, that the following descriptions, while indicating embodiments and numerous specific details thereof, are given by way of illustration and not of limitation. Many changes and modifications may be made within the scope of the embodiments herein and the embodiments herein include all such modifications.

BRIEF DESCRIPTION OF FIGURES

Embodiments of the present disclosure are illustrated in the accompanying drawings, throughout which like reference letters indicate corresponding parts in the various figures. The embodiments herein will be better understood from the following description with reference to the drawings, in which:

FIG. 4 is a flow diagram illustrating a method for enhancing the NAS signaling in the UE RACS in the wireless network, according to an embodiment as disclosed herein; and FIG. 5A, FIG. 5B, FIG. 6A, FIG. 6B, FIG. 7, FIG. 8A and FIG. 8B, are sequential diagrams illustrating various signaling for enhancing the NAS signaling between the UE and the server in the wireless network, according to an embodiment as disclosed herein.

DETAILED DESCRIPTION

Figure 1A:
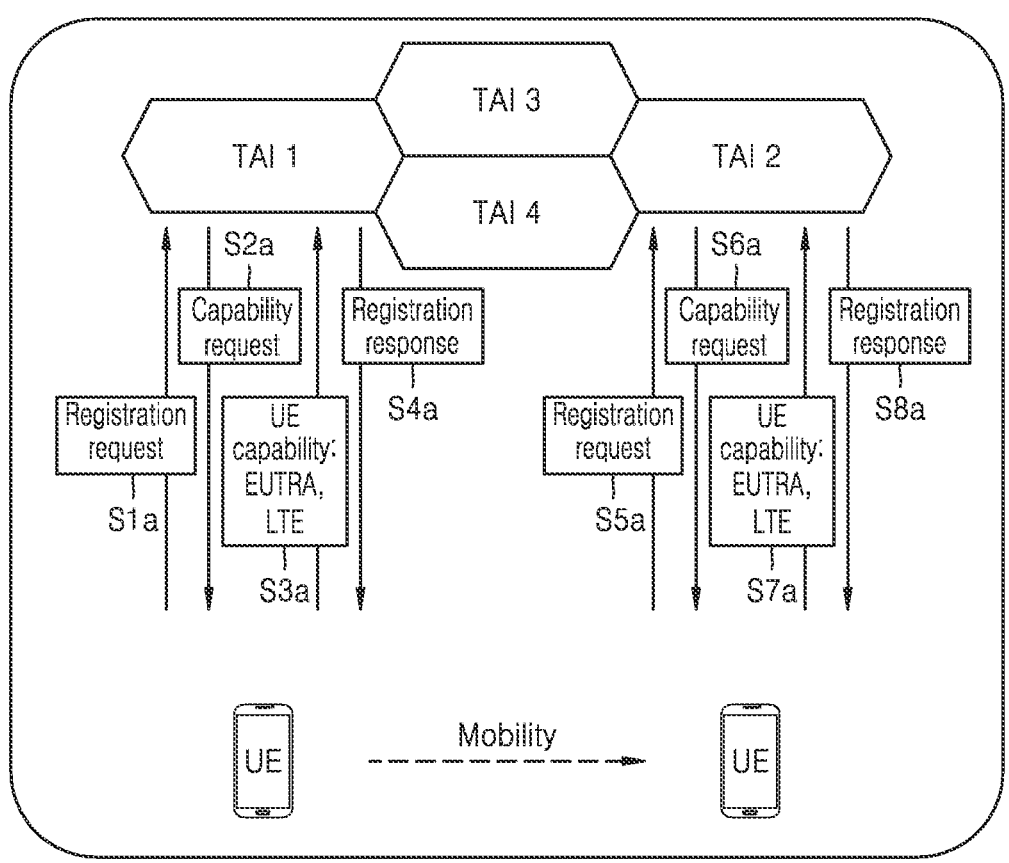
FIG. 1A is an example scenario illustrating a registration procedure of a UE without using a UE RACS in a wireless network, according to a prior art.
Figure 1B:
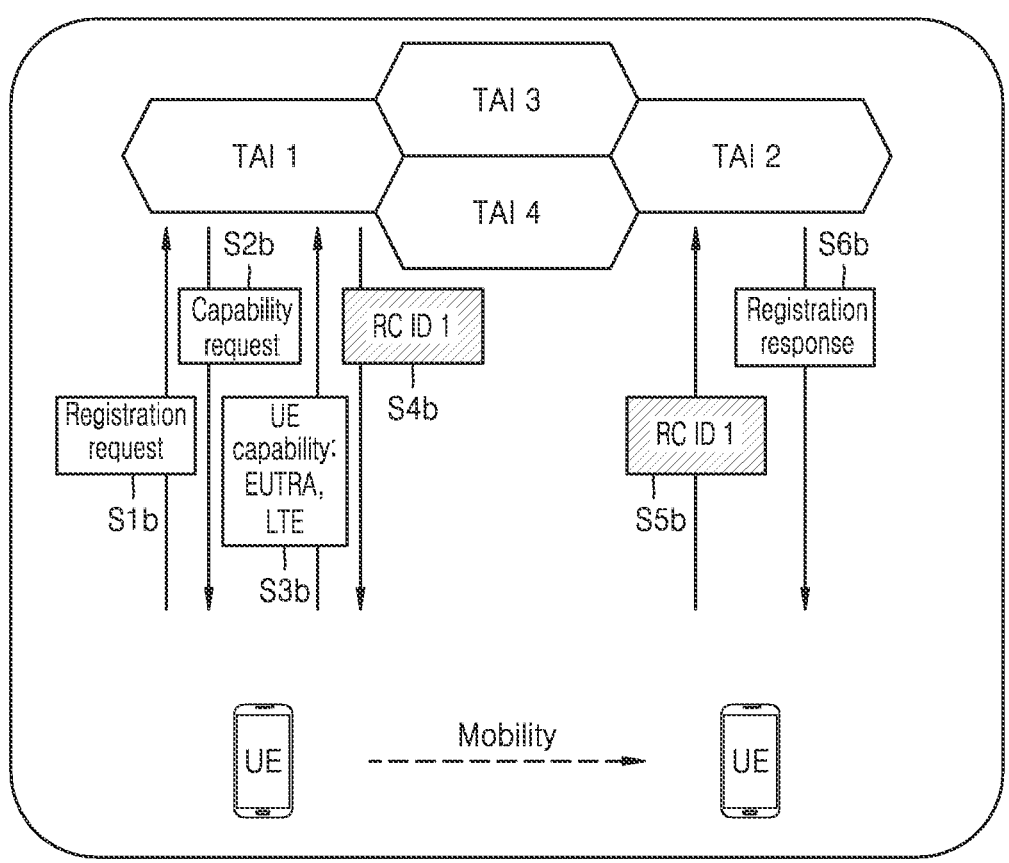
FIG. 1B is an example scenario illustrating a registration procedure of the UE using the UE RACS in the wireless network, according to the prior art.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features, and the embodiments presented herein are not limited by the accompanying drawings. As such, the present disclosure should be construed to extend to any alterations, equivalents, and substitutes in addition to those which are particularly set out in the accompanying drawings. Although the terms first, second, etc. may be used herein to describe various elements, these elements should not be limited by these terms. These terms are generally only used to distinguish one element from another.

Accordingly, embodiments herein provide a method for enhancing NAS signaling in a UE RACS in a wireless network. The method includes receiving, by a UE, an RC_ID in an RC_ID_IE from a server of the wireless network to optimize transmission of the UE. Further, the method includes sending, by the UE, a registration request message to the server to establish NAS signaling between the UE and the server. Further, the method includes establishing, by the UE, the NAS signaling between the UE and the server. Further, the method includes enhancing, by the UE, the NAS signaling between the UE and the server by performing one of: (a) receiving a registration accept message with an RC_ID deletion IE from the server, and sending a registration complete message to the server using the existing NAS signaling and without starting a release timer in response to receiving the RC_ID deletion IE in the registration accept message; and (b) receiving the registration accept message with the RC_ID deletion IE from the server and not sending the registration complete message to the server in response to receiving the RC_ID deletion IE in the registration accept message.

Accordingly, the embodiments herein provide a UE for enhancing NAS signaling in a UE RACS in a wireless network. The UE includes an NAS signaling controller coupled with a processor and a memory. The NAS signaling controller is configured to receive an RC_ID_IE from a server of the wireless network to optimize a transmission of the UE. Further, the NAS signaling controller is configured to send a registration request message to the server to establish NAS signaling between the UE and the server. Further, the NAS signaling controller is configured to establish the NAS signaling between the UE and the server. Further, the NAS signaling controller is configured to enhance the NAS signaling between the UE and the server by performing one of: (a) receiving a registration accept message with an RC_ID deletion IE from the server, and sending a registration complete message to the server using the existing NAS signaling and without starting a release timer in response to receiving the RC_ID deletion IE in the registration accept message; and (b) receiving the registration accept message with the RC_ID deletion IE from the server and not sending the registration complete message to the server in response to receiving the RC_ID deletion IE in the registration accept message.

Unlike existing methods and systems, methods described herein may allow the UE to retain an NAS signaling connection after deletion of UE RC_IDs stored in a UE for a current PLMN, where the deletion of UE RC_IDs is based on receipt of the registration accept message from a wireless network. Furthermore, a timer T3540 should not be started in the UE in response to receiving the registration accept message with the deletion of UE RC_IDs. Accordingly, the UE can immediately initiate a registration procedure using the existing NAS signaling connection. This may help reduce delay of completing the registration procedure and saves radio resources associated with the UE and the wireless network.

Unlike existing methods and systems, methods described herein may allow the UE to remove a redundant requirement of sending a registration complete message as an acknowledgement to the wireless network after receiving the registration accept message which causes the deletion of UE RC_IDs from the wireless network. This may help reduce signaling overhead in both the UE and the wireless network.

Unlike existing methods and systems, methods described herein may allow the UE to consider UE RC_IDs received in the registration accept message to be valid for the current PLMN and re-useable when the registration procedure is re-initiated due to TAI change or lower layers failures. This may help reduce signaling interchanged between the UE and the wireless network when the UE tries to re-initiate the registration procedure with UE Radio Capability IE included in a registration request message.

Unlike existing methods and systems, methods described herein may allow the UE to use the same RC_IDs received in the registration accept message when the newly camped TAC is not in the UE's TAI list. If AMF/MME is the same then no new UE RC_IDs will be assigned. If AMF/MME is changed then the existing procedure of new UE RC_IDs assignment will be followed. This may help reduce signaling interchanged between the UE and the wireless network in mobility scenarios.

Throughout this disclosure, the terms "registration request", and "registration request message" are used interchangeably and may be taken to mean the same. Throughout this disclosure, the terms "registration accept" and "registration accept message" are used interchangeably and may be taken to mean the same. Throughout this disclosure, the terms "registration complete", and "registration complete message" are used interchangeably and may be taken to mean the same. Throughout this disclosure, the terms "wireless network", "network", and "N/W" are used interchangeably and may be taken to mean the same. Throughout this disclosure, the terms "UE RC_ID_IE" and "RC_ID_IE" are used interchangeably and may be taken to mean the same.

FIG. 2A, FIG. 2B, FIG. 2C, FIG. 2D, FIG. 2E, FIG. 2F, FIG. 2G and FIG. 2H are sequential diagrams illustrating various signaling for establishing NAS signaling between a UE (10) (e.g. UE, network node, IAB node, etc.) and a server (20) (e.g. server, core network, cloud network, wireless network, 5GC NW (20b), NR RRC (20a) etc.) using conventional RACS features/procedures, according to the prior art.

Figure 2A:
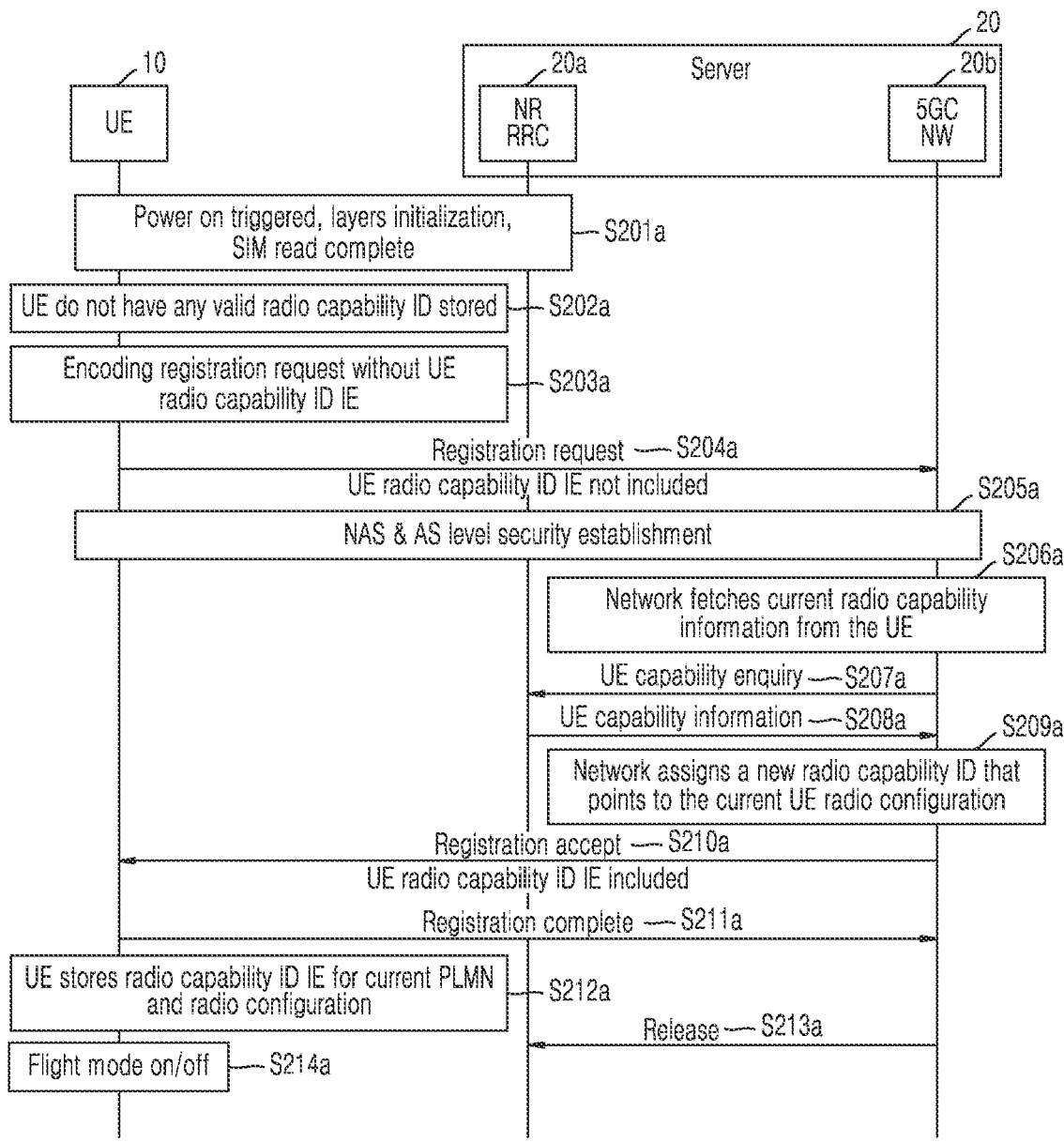
FIG. 2A, FIG. 2B, FIG. 2C, FIG. 2D, FIG. 2E, FIG. 2F, FIG. 2G and FIG. 2H are sequential diagrams illustrating various signaling for establishing NAS signaling between a UE and a server using conventional RACS features/procedures, according to the prior art.
Figure 2B:
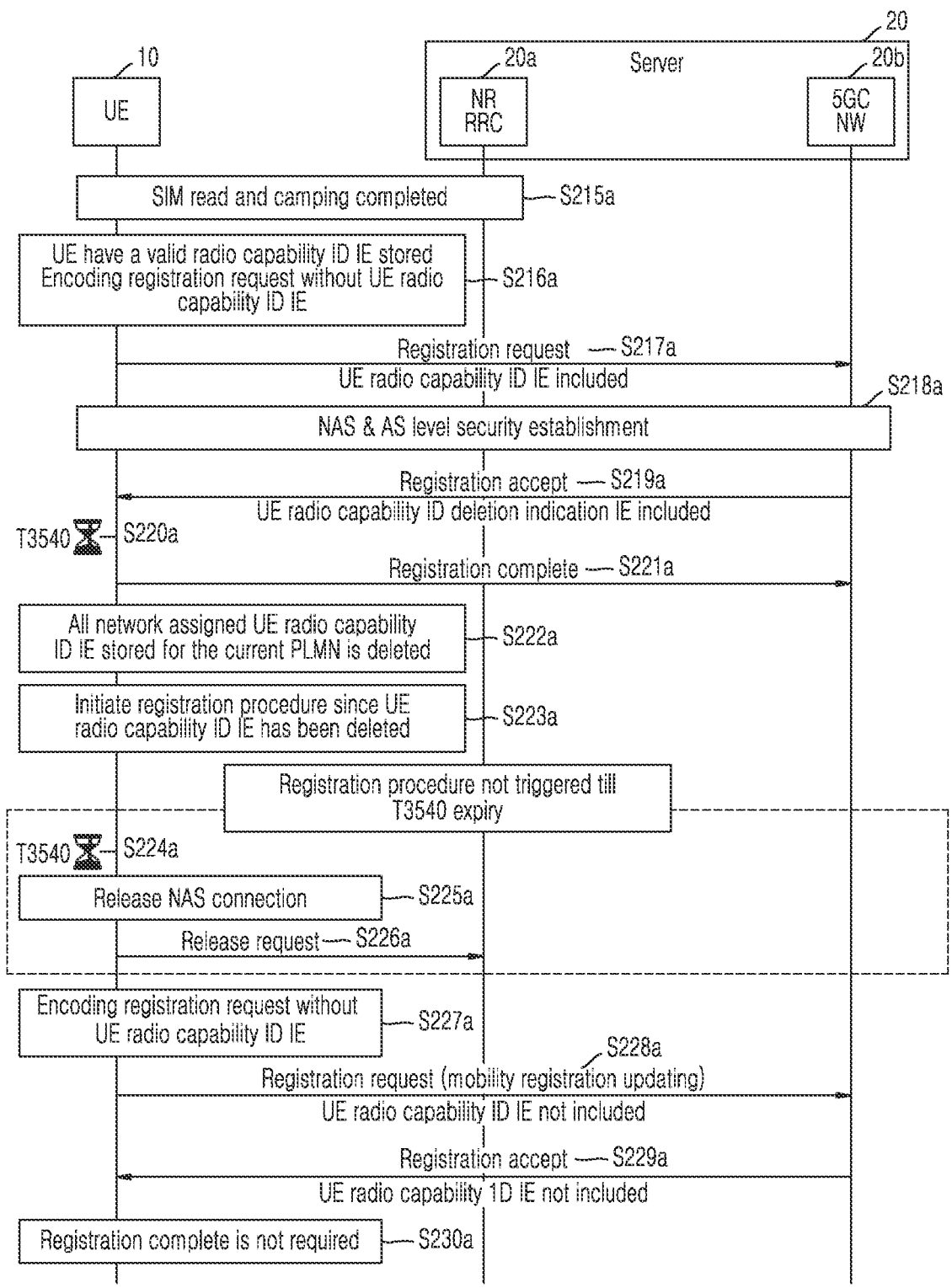

Referring to FIG. 2A and FIG. 2B: at S201a, the UE (10) performs initial operations (e.g. power-on, layer initialization, SIM read) to establish a connection with the server (20). At S202a-S203a, the UE (10) determines that no valid RC_ID_IE is stored in a memory of the UE (10). The UE (10) encodes a registration request message without using the RC_ID_IE. At S204a-S205a, the UE (10) sends the registration request to the server (20) to establish the NAS signaling between the UE (10) and the server (20), where the registration request message does not comprise the RC_ID_IE. At S206a-S209a, the server (20) fetches a current RC information and assigns a new RC_ID to a current UE radio configuration. At S210a, the server (20) sends a UE RC_ID_IE to the UE (10) in a registration accept. At S211a, the UE (10) sends a registration complete to the server (20) in response to receiving the registration accept. At S212a-

S213a, the UE (10) stores the UE RC_ID_IE for the current PLMN and current UE radio capability configuration and release connection.

At S214a-S215a, the UE (10) performs the initial operations again to establish the connection with the server (20). At S216a, the UE (10) determines that the valid RC_ID is stored (S212a) in the memory of the UE (10). At S217a, the UE (10) sends the UE RC_ID_IE with RC_ID to the server (20) in the registration request. At S218a, the UE (10) establishes the NAS signaling with the server (20). At S219a, the server (20) sends a UE RC_ID deletion IE to the UE (10) in the registration accept.

At S220a, the UE (10) starts a timer (e.g., T3540) in the UE (10) based on receiving the UE RC_ID deletion IE from the server (20). At S221a-S226a, the UE (10) sends a registration complete to the server (20), deletes all valid RC_IDs stored (S212a) in the memory of the UE (10), and initiates a registration procedure. Based on receiving the registration accept message, the UE (10) starts the timer for local release of the NAS signaling connection and this prevents the UE (10) from sending any signaling messages. Accordingly, only after the expiry of the timer (224a), the registration procedure triggered due to UE RC_ID deletion IE can be sent to the server (20) after the release procedure and a new signaling connection is performed.

At S227a, the UE (10) encodes the registration request message without using the RC_ID_IE. At S228a, the UE (10) sends the registration request to the server for mobility registration updating, where the registration request message does not comprise the RC_ID_IE. At S229a-S230a, the server (20) sends the registration accept without using the RC_ID_IE and the UE (10) does not send the registration complete to the server (20).

One or more impact(s) due to FIG. 2A and FIG. 2B signaling are explained next. When the UE (10) starts the timer, there are no Uplink (UL) or Downlink (DL) services that can be provided to the UE (10) for up to 10 seconds. Accordingly, an additional, unnecessary overhead is imposed on the UE (10) to wait for an already established RRC connection to break or be released by the server (20)/local release, perform a cell selection procedure to camp on the same cell and re-establish the RRC connection again to send the registration request which the UE (10) and the server (20) both know is pending. Accordingly, the conventional RACS features/procedures require improvisation, and an improvisational solution is described with respect to FIG. 5A and FIG. 5B.

Figure 2C:
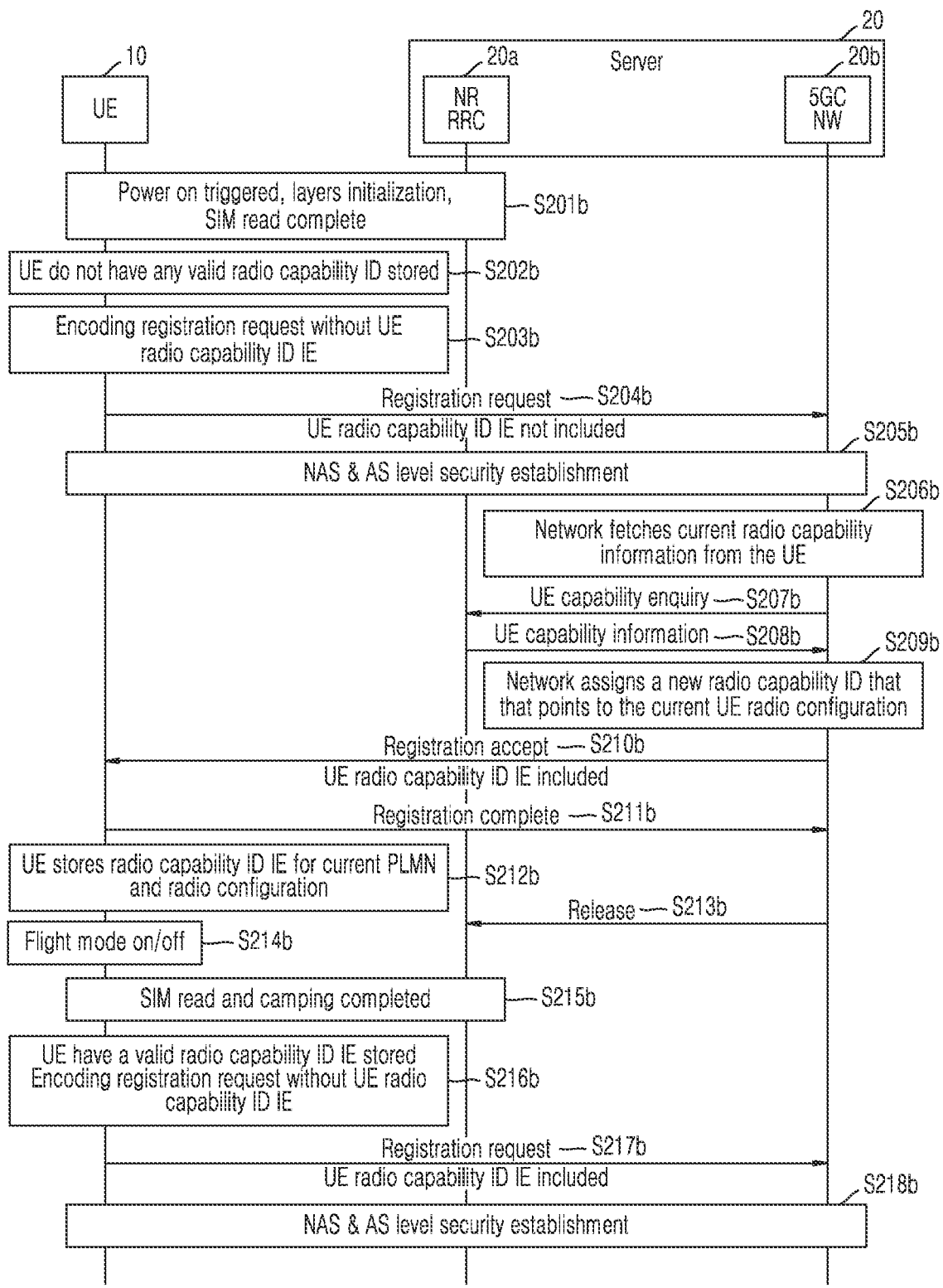
Figure 2D:
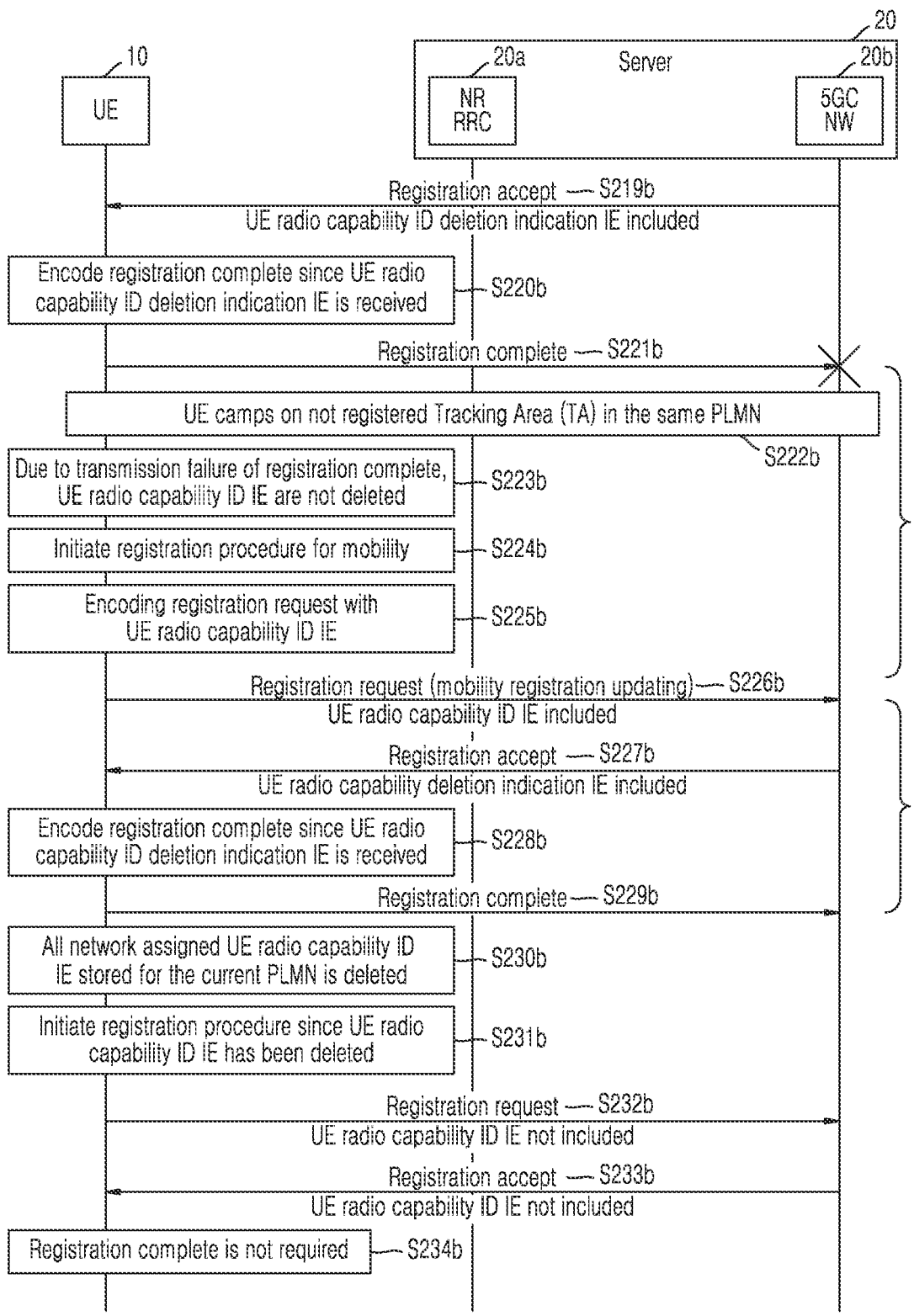

Referring to FIG. 2C and FIG. 2D: at S201b, the UE (10) performs initial operations to establish the connection with the server (20). At S202b-S203b, the UE (10) determines that no valid RC_ID is stored in the memory of the UE (10). The UE (10) encodes the registration request message without using the RC_ID_IE. At S204b-S205b, the UE (10) sends the registration request to the server (20) to establish the NAS signaling between the UE (10) and the server (20), where the registration request message does not comprise the RC_ID_IE. At S206b-S209b, the server (20) fetches the current Radio Capability information and assigns the new RC_ID to this current UE radio capability configuration. At S210b, the server (20) sends the UE RC_ID_IE to the UE (10) in the registration accept. At S211b, the UE (10) sends the registration complete to the server (20) in response to receiving the registration accept. At S212b-S213b, the UE (10) stores the UE RC_ID for the current PLMN and current UE radio configuration and release connection.

At S214b-S215b, the UE (10) performs the initial operations again to establish the connection with the server (20). At S216b, the UE (10) determines that the valid RC_ID is stored (S212b) in the memory of the UE (10). At S217b, the UE (10) sends the UE RC_ID_IE with RC_ID to the server (20) in the registration request. At S218b, the UE (10) establishes the NAS signaling with the server (20). At S219b, the server (20) sends the UE RC_ID deletion IE to the UE (10) in the registration accept.

At S220b, the UE (10) encodes the registration complete message when the UE RC_ID deletion IE is received in the registration accept from the server (20). At S221b-S223b, the UE (10) sends the registration complete to the server (20) and detects that the transmission of the registration complete fails due to cell change into a TA that is not registered in the same PLMN (transmission failure). In result, the UE (10) does not perform the deletion of the UE RC_ID associated with the current PLMN.

At S224b, the UE (10) initiates the registration procedure for mobility. At S225b, the UE (10) encodes the registration request using the stored RC_ID in an RC_ID_IE. At S226b, the UE (10) sends the registration request to the server (20) for mobility updating. At S227b, the server (20) sends the UE RC_ID deletion IE to the UE (10) in the registration accept. At S228b, the UE (10) encodes the registration complete message when the UE RC_ID deletion IE is received in the registration accept from the server (20). At S229b, the UE (10) sends the registration complete to the server (20).

At S230b-S231b, the UE (10) deletes all valid RC_IDs stored (S212b) in the memory of the UE (10) and initiates the registration procedure. The registration procedure is mandatory after deleting all the valid stored RC_IDs in the memory (S212b). At S232b, the UE (10) sends the registration request to the server, where the registration request message does not comprise the RC_ID_IE. At S233b-S234b, the server (20) sends the registration accept without using the RC_ID_IE and the UE (10) does not send the registration complete to the server (20).

One or more impact(s) due to FIG. 2C and FIG. 2D signaling are explained next. Mandatorily sending the registration complete after receiving the UE RC_ID deletion IE, deleting the RC_IDs, and then again initiating a registration procedure is considered to be multiple actions taken by the UE (10) for the same purpose. This causes signaling overhead in both the UE (10) and the network side (e.g., the server (20)). For example, when the registration complete fails due to cell change into a TA that is not registered in the same PLMN (transmission failure), increased signaling (e.g., S222b to S228b) between the UE (10) and the server (20) results. Accordingly the conventional RACS features/procedures require improvisation, and an improvisational solution is described with respect to FIG. 6A and FIG. 6B.

Figure 2E:
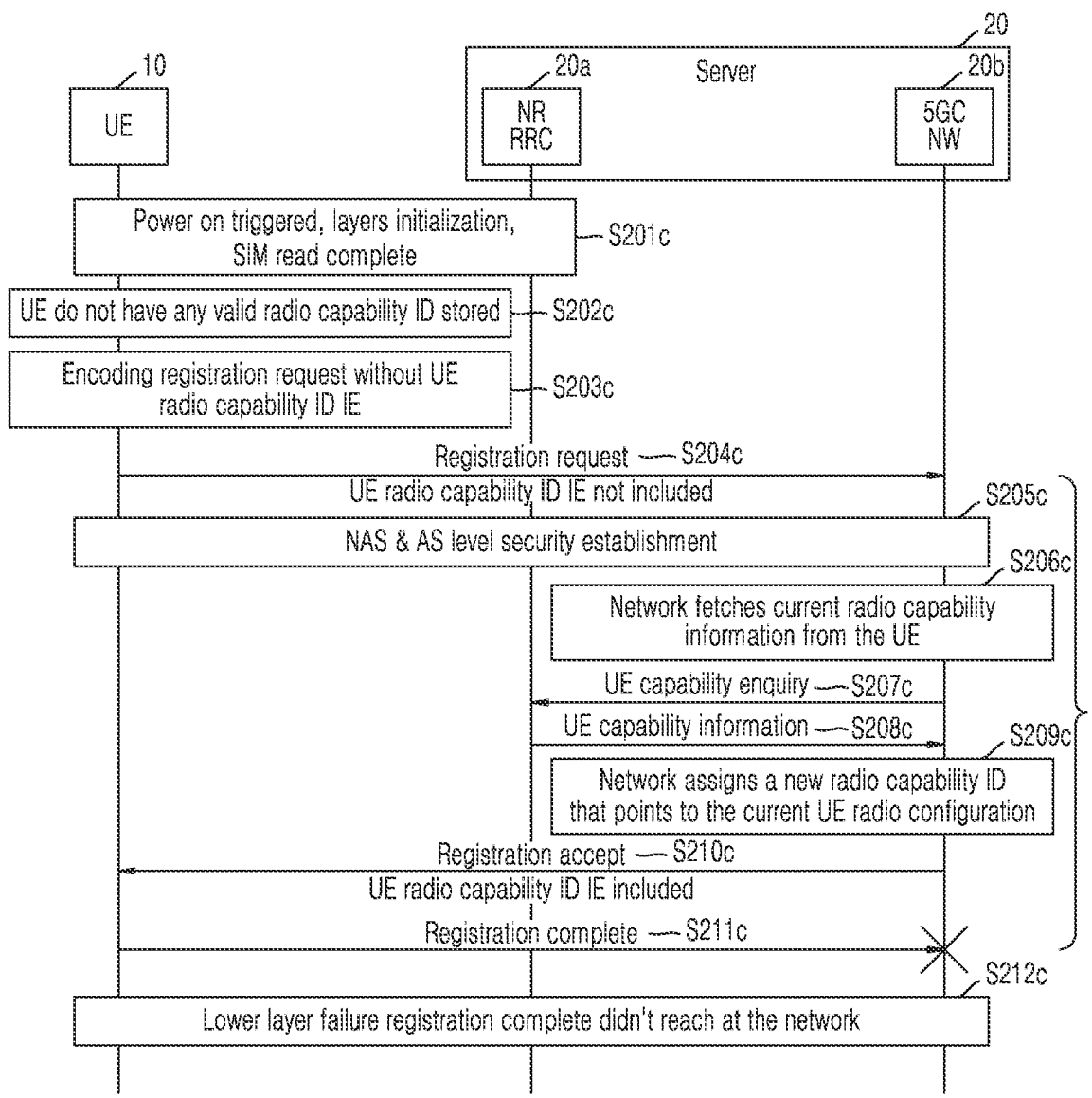
Figure 2F:
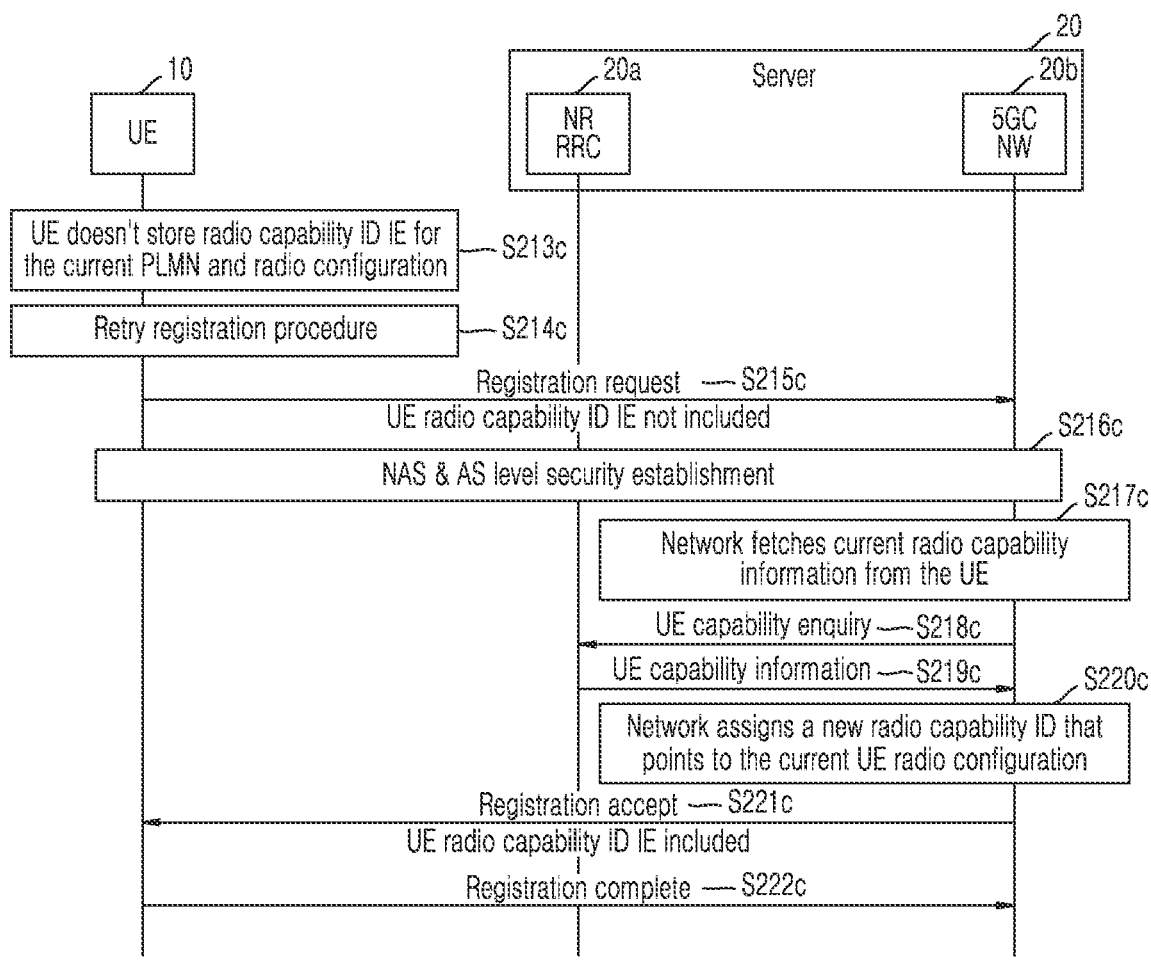

Referring to FIG. 2E and FIG. 2F, at S201c, the UE (10) performs initial operations to establish the connection with the server (20). At S202c-S203c, the UE (10) determines that no valid RC_ID is stored in the memory of the UE (10). The UE (10) encodes the registration request message without using the RC_ID_IE. At S204c-S205c, the UE (10) sends the registration request to the server (20) to establish the NAS signaling between the UE (10) and the server (20), where the registration request message does not comprise the RC_ID_IE. At S206c-S209c, the server (20) fetches the current radio capability information and assigns the new RC_ID to this current UE radio capability configuration. At S210c, the server (20) sends the UE RC_ID_IE with RC_ID to the UE (10) in the registration accept. At S211c-S214c, the UE (10) sends the registration complete to the server (20) in response to receiving the registration accept, detects that the transmission of the registration complete fails due to a cell change into a TA that is not registered in the same PLMN (transmission failure), and the UE (10) does not store the received UE RC in the memory of the UE (10). Accordingly, the UE (10) must retry the registration procedure.

At S215c-S216, the UE (10) sends the registration request to the server (20) to establish the NAS signaling between the UE (10) and the server (20), where the registration request message does not comprise the RC_ID_IE. At S217c-S220c, the server (20) fetches the current radio capability information and assigns the new RC_ID to this current UE radio capability configuration. At S221c, the server (20) sends the UE RC_ID in an RC_ID_IE to the UE (10) in the registration accept. At S222c, the UE (10) sends the registration complete to the server (20) in response to receiving the registration accept.

One or more impact(s) due to FIG. 2E and FIG. 2F signaling are explained next. When the server (20) assigns the RC_ID_IE in the registration accept but has not received the registration complete due to lower layer failure or due to change in the TAI, the behaviors of both the UE (10) and the server (20) will lead to signaling overhead. In addition the overall purpose of RACS is not used efficiently. Further, in some cases like lower layer failure before sending the registration complete without the TAI change, though the current 3GPP specification indicates a UE implementation UE (e.g., by the UE (10)), re-initiation of registration is the common solution that is found to be working with all networks. Accordingly, conventional RACS features/procedures require improvisation, and an improvisational solution is described with respect to FIG. 7.

Figure 2G:
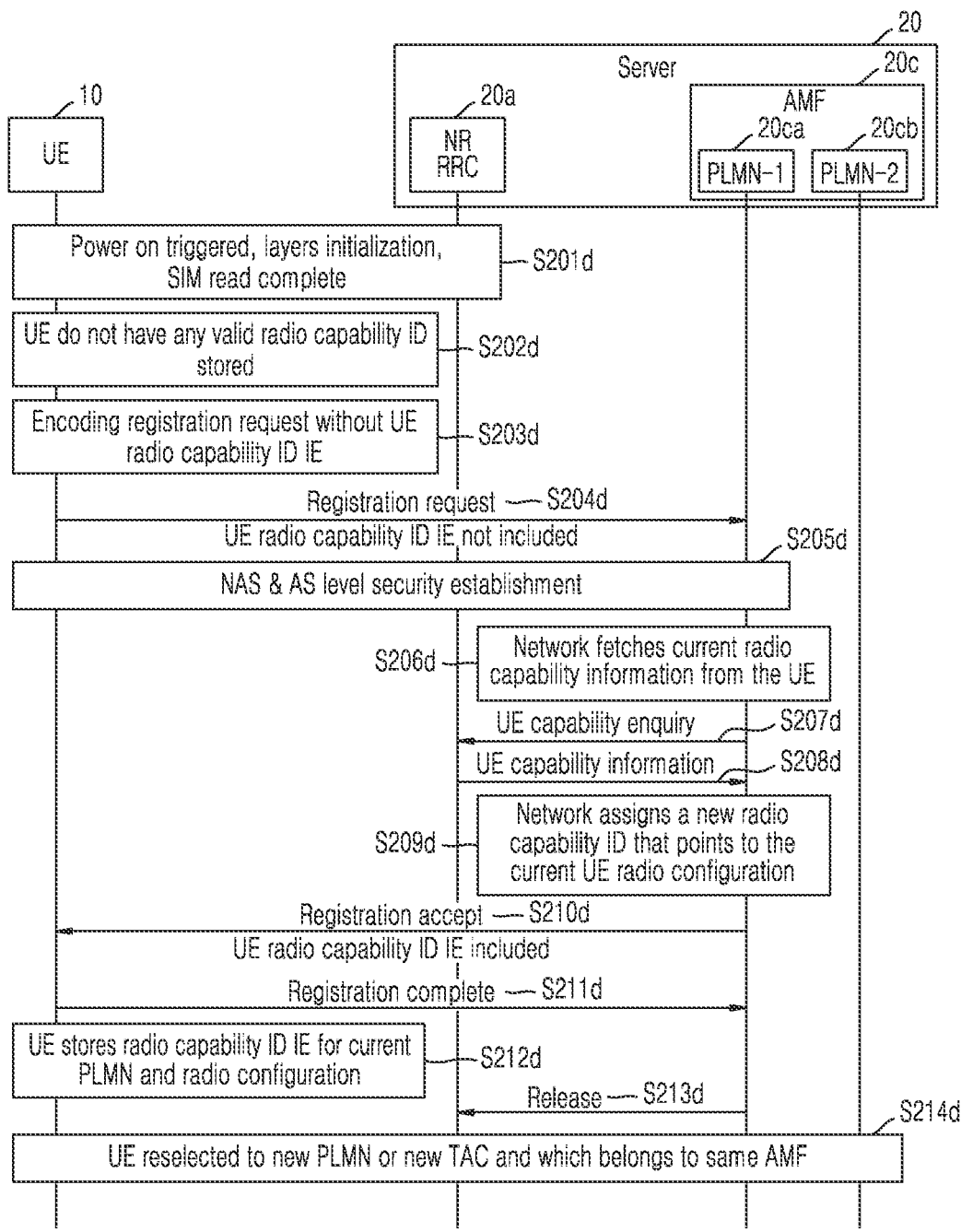
Figure 2H:
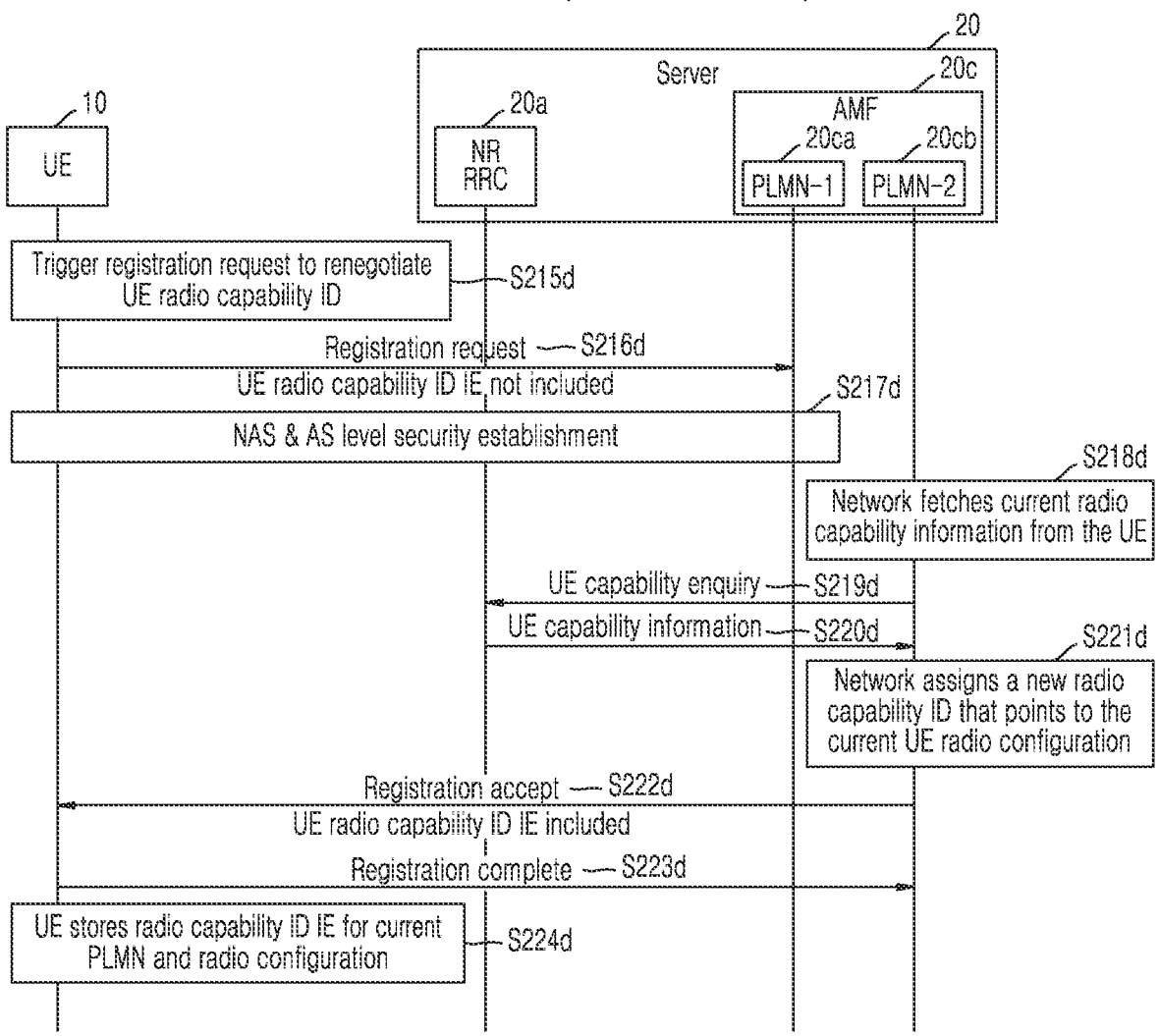

Referring to FIG. 2G and FIG. 2H, at S201d, the UE (10) performs initial operations to establish the connection with the server (20). At S202d-S203d, the UE (10) determines that no valid RC_ID is stored in the memory of the UE (10). The UE (10) encodes the registration request message without using the RC_ID_IE. At S204d-S205d, the UE (10) sends the registration request to the server (20) to establish the NAS signaling between the UE (10) and the server (20), where the registration request message does not comprise the RC_ID_IE. At S206d-S209d, the server (20) fetches the current radio capability information and assigns the new RC_ID to this current UE radio capability configuration. At S210d, the server (20) sends the UE RC_ID_IE to the UE (10) in the registration accept. At S211d-S213d, the UE (10) sends the registration complete to the server (20) in response to receiving the registration accept, stores the received UE RC_ID_IE in the memory of the UE (10), and releases the connection.

At S214d, the UE (10) reselects to a new PLMN/TAC and detects that the reselected PLMN (20cb)/TAC belongs to the same AMF (20c). At S215d, the UE (10) triggers the registration request again to negotiate a new UE RC_ID. At S216d-S217d, the UE (10) sends the registration request to the server (20) to establish the NAS signaling between the UE (10) and the server (20), where the registration request message does not comprise the RC_ID_IE. At S218d-S221d, the server (20) fetches the current radio capability information and assigns the new RC_ID to this current UE radio capability configuration. At S222d, the server (20) sends the RC_ID in an RC_ID_IE to the UE (10) in the registration accept. At S223d-S224d, the UE (10) sends the registration complete to the server (20) in response to receiving the registration accept, and stores the received UE RC_ID in the memory of the UE (10).

One or more impact(s) due to FIG. 2G and FIG. 2H signaling are explained next. After receiving the UE RC_ID in an RC_ID_IE in the registration accept message for current PLMN, the current 3GPP specification states that the UE (10) will initiate registration procedure after moving to new PLMN or TAC to renegotiate UE RC_ID even though new PLMN or TAC belongs to same AMF (20c). Accordingly, conventional RACS features/procedures require improvisation, and an improvisational solution is described with respect to FIG. 8A and FIG. 8B.

Referring now to the drawings and more particularly to the drawings from FIG. 3 through FIG. 8A and FIG. 8B, several embodiments are shown where similar reference characters denote corresponding features consistently throughout the figures.

Figure 3:
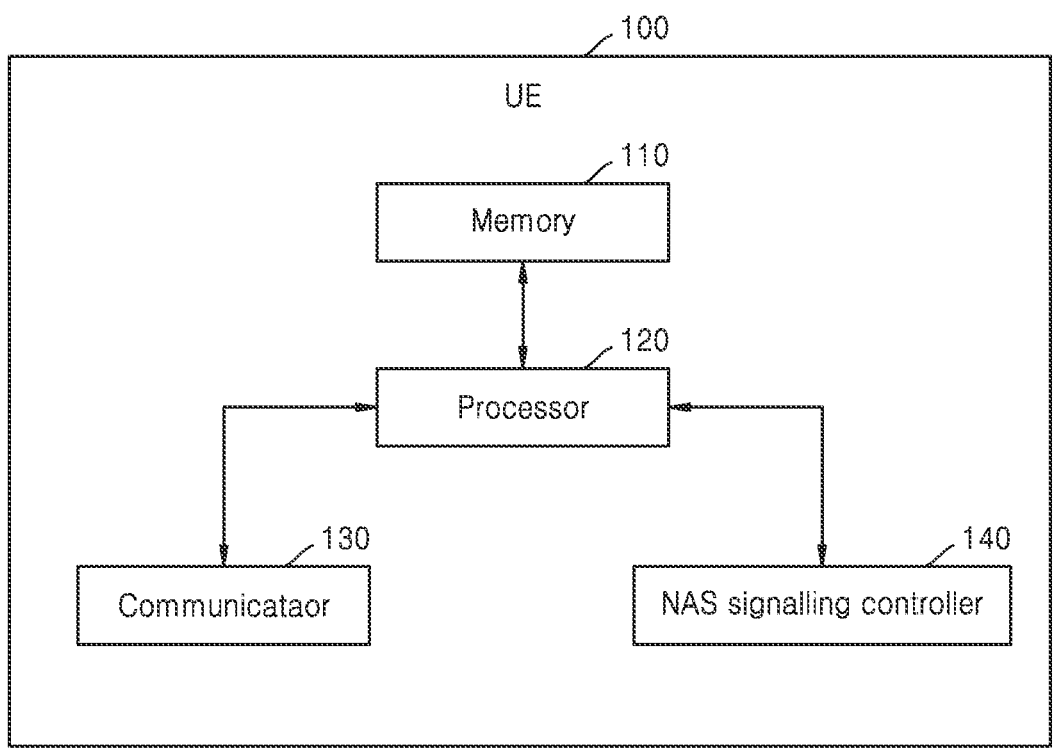
FIG. 3 illustrates a block diagram of the UE for enhancing the NAS signaling in the UE RACS in the wireless network, according to an embodiment as disclosed herein.

FIG. 3 illustrates a block diagram of the UE (100) for enhancing the NAS signaling in the UE RACS in the wireless network, according to an embodiment as disclosed herein.

In an embodiment, the UE (100) includes a memory (110), a processor (120), a communicator (130) and an NAS signaling controller (140).

In an embodiment, the memory (110) is configured to store the RC_ID(s), TAC(s), and TAI list. The memory (110) stores instructions to be executed by the processor (120). The memory (110) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (110) may, in some examples, be considered a non-transitory storage medium. The term "non-transitory" may indicate that the storage medium is not embodied in a carrier wave or a propagated signal. However, the term "non-transitory" should not be interpreted that the memory (110) is non-movable. In certain examples, a non-transitory storage medium may store data that can, over time, change (e.g., in Random Access Memory (RAM) or cache). The memory (110) can be an internal storage unit or it can be an external storage unit of the UE (100), a cloud storage, or any other type of external storage.

The processor (120) communicates with the memory (110), the communicator (130), and the NAS signaling controller (140). The processor (120) is configured to execute instructions stored in the memory (110) and to perform various processes. The processor (120) may include one or a plurality of processors, may be a general-purpose processor, such as a Central Processing Unit (CPU), an Application Processor (AP), or the like, a graphics-only processing unit such as a Graphics Processing Unit (GPU), a Visual Processing Unit (VPU), and/or an Artificial intelligence (AI) dedicated processor such as a Neural Processing Unit (NPU).

The communicator (130) is configured for communicating internally between internal hardware components (e.g. the memory (110), the processor (120), and the NAS signaling controller (140)) and with external devices (e.g. one or more of the server (200)) via one or more networks (e.g. internet, Wi-Fi, Radio channel, etc.). The communicator (130) includes an electronic circuit specific to a standard that enables wired and/or wireless communication.

The NAS signaling controller (140) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the NAS signaling controller (140) is configured to receive an RC_ID in an RC_ID_IE from a server (200) of a wireless network (1000) to optimize a transmission of the UE (100). Further, the NAS signaling controller (140) is configured to send a registration request message to the server (200) to establish NAS signaling between the UE (100) and the server (200). Further, the NAS signaling controller (140) is configured to establish the NAS signaling between the UE (100) and the server (200). Further, the NAS signaling controller (140) is configured to enhance the NAS signaling between the UE (100) and the server (200) by performing one of: (a) receiving a registration accept message with an RC_ID deletion IE from the server (200), and sending a registration complete message to the server (200) using the existing NAS signaling and without starting a release timer in response to receiving the RC_ID deletion IE in the registration accept message; and (b) receiving the registration accept message with the RC_ID deletion IE from the server (200) and not sending the registration complete message to the server (200) in response to receiving the RC_ID deletion IE in the registration accept message.

In an embodiment, the NAS signaling controller (140) is configured to mandatorily initiate a registration procedure for mobility in a connected mode and using existing an NAS signaling connection after receiving the RC_ID deletion IE in the registration accept message, where the registration procedure in the connected mode reduces the NAS signaling latency and usage of radio resources between the UE (100) and the server (200).

In an embodiment, the NAS signaling controller (140) is configured to determine that the RC_ID is not stored in the UE (100). Further, the NAS signaling controller (140) is configured to encode the registration request message without using the RC_ID_IE in response to determining that the RC_ID_IE is not stored in the UE (100). Further, the NAS signaling controller (140) is configured to send the registration request message to the server (200) to establish the NAS signaling between the UE (100) and the server (200), where the registration request message does not comprise the RC_ID_IE. Further, the NAS signaling controller (140) is configured to receive the registration accept message from the server (200), where the registration accept message comprises the RC_ID_IE.

In an embodiment, the NAS signaling controller (140) is configured to perform one of: storing the received RC_ID in the UE (100) and sending the registration complete message to the server (200); sending the registration complete message to the server (200) and storing the received RC_ID in the UE (100); storing the received RC_ID in the UE (100) and reinitiating a registration procedure due to one of change in a Tracking Area Identity (TAI) and lower layers failures or transmission failure of the registration complete message to the server (200); and sending the registration complete message to the server (200), storing the received RC_ID in the UE (100), and reinitiating a registration procedure based on a TAC change (tracking area code change) in a serving Public Land Mobile Network (PLMN) of the wireless network (1000).

In an embodiment, the NAS signaling controller (140) is configured to detect that the registration complete message is not received at the server (200). Further, the NAS signaling controller (140) is configured to retain the stored RC_ID. Further, the NAS signaling controller (140) is configured to reinitiate the registration procedure by using the retained RC_ID in a registration request with RC_ID_IE.

In an embodiment, the NAS signaling controller (140) is configured to determine whether the TAC is associated with the TAI and the serving PLMN is associated with the server (200), where the TAI is received in the registration accept message from the server (200). Further, the NAS signaling controller (140) is configured to trigger the registration procedure using the stored RC_ID in response to determining that the TAC is not associated with the TAI and the serving PLMN is associated with the server (200); and reinitiate the registration procedure using a new RC_ID in response to determining that the TAC is not associated with the TAI and the serving PLMN is not associated with the server (200).

In an embodiment, the RC_ID comprises a set of radio capabilities of the UE (100), where the RC_ID is used as an alternative to an AS signaling message in the wireless network (1000), and where the RC_ID is allocated by the server (200) of the wireless network (1000) during a registration procedure or by using a manufacturer RC_ID stored in the UE (100) by the OEM (original equipment manufacturer).

In an embodiment, the RC_ID of the UE (100) is updated through an Open Mobile Alliance (OMA) Device Management (DM) of the wireless network (1000), and where the allocated RC_ID is only applicable to a current radio configuration of the UE (100) and is usable in all PLMNs.

In an embodiment, the UE (100) deletes all stored RC_IDs allocated by the server (200), associated with the serving PLMN based on receiving the RC_ID deletion IE in the registration accept message.

Although FIG. 3 shows various hardware components of the UE (100), it is to be understood that other embodiments are not limited thereto. In other embodiments, the UE (100) may include fewer or a greater number of components. Further, the labels or names of the components are used only for illustrative purpose and do not limit the scope of the teachings herein. One or more components can be combined to perform the same or substantially similar function to enhance the NAS signalling.

FIG. 4 is a flow diagram (S400) illustrating a method for enhancing the NAS signaling in the UE RACS in the wireless network (1000), according to an embodiment as disclosed herein.

At S402, the UE (100) performs initial operations (e.g. power-on, layer initialization, SIM read) to establish a connection with the server (200). At S404, the UE (100) determines whether any valid RC_ID is stored in the memory (110) of the UE (100). At S406, the UE (100) determines whether any valid manufacturer-assigned UE RC_ID is stored in the memory (110) of the UE (100) in response to determining that no valid RC_ID is stored in the memory (110) of the UE (100) (S404=No). At S408, the UE (100) encodes a registration request message using the UE RC_ID_IE when the UE (100) has any valid RC_ID stored in the memory (110) or any valid manufacturer-assigned UE RC_ID is stored in the memory (110) (S404=Yes).

At S410, the UE (100) sends the registration request to the server (20) to establish the NAS signaling between the UE (100) and the server (200), where the registration request message does not comprise the UE RC_ID_IE. At S412, the server (200) fetches a current radio capability information and assigns a new RC_ID to this current UE radio capability configuration, if the UE (100) does not have the RC_ID to the current UE radio configuration. Then, the server (200) sends a UE RC_ID_IE to the UE (100) in a registration accept.

At S414, the UE (100) determines whether the UE RC_ID_IE with RC_ID is received in the registration accept. At S416, the UE (100) stores the UE RC_ID in the memory (110) and sends the registration complete to the server (200) of the network or N/W that includes the server (200), in response to determining that the UE RC_ID_IE is received in the registration accept (S414=Yes). At S418, the UE (100) determines whether the UE RC_ID_IE deletion is received from the server (200) in response to determining that the UE RC_ID_IE is not received in the registration accept (S414=No).

At S420, the UE (100) deletes the UE RC_ID of the current PLMN from the memory (110) and stores the pending registration trigger due to the UE RC_ID_IE deletion in response to determining that the UE RC_ID_IE deletion is received from the server (200) (S418=Yes). At S422, the UE (100) determines whether the registration complete has to be sent to the server (200). At S424, the UE (100) determines whether the transmission is successful in response to determining that the registration complete has to be sent to the server (200) (S422=Yes).

At S426, the UE (100) determines whether any pending registration process is stored in response to determining that one of: the transmission is successful; the registration complete is not sent to the server (200); and the UE RC_ID_IE deletion is not received from the server (200). At S428, the UE (100) determines whether any pending registration process for UE RC_ID_IE deletion is stored in response to determining that any pending registration process is stored (S426=Yes). At S429, the UE (100) starts the timer in response to determining that no pending registration process is stored for the UE RC_ID_IE deletion (S428=No). At S430, the registration is completed in response to determining that no pending registration process is stored (S426=No), or otherwise after the timer is started at S429.

The various actions, acts, blocks, steps, or the like in the flow diagram (S400) may be performed in the order presented, in a different order or simultaneously. Further, in some embodiments, some of the actions, acts, blocks, steps, or the like may be omitted, added, modified, skipped, or the like without departing from the scope of the teachings herein or the invention(s) to which the teachings herein are drawn.

FIG. 5A, FIG. 5B, FIG. 6A, FIG. 6B, FIG. 7, FIG. 8A and FIG. 8B are sequential diagrams illustrating various signaling for enhancing the NAS signaling between the UE (100) and the server (200) in the wireless network (1000), according to embodiment disclosed herein.

Figure 5A:
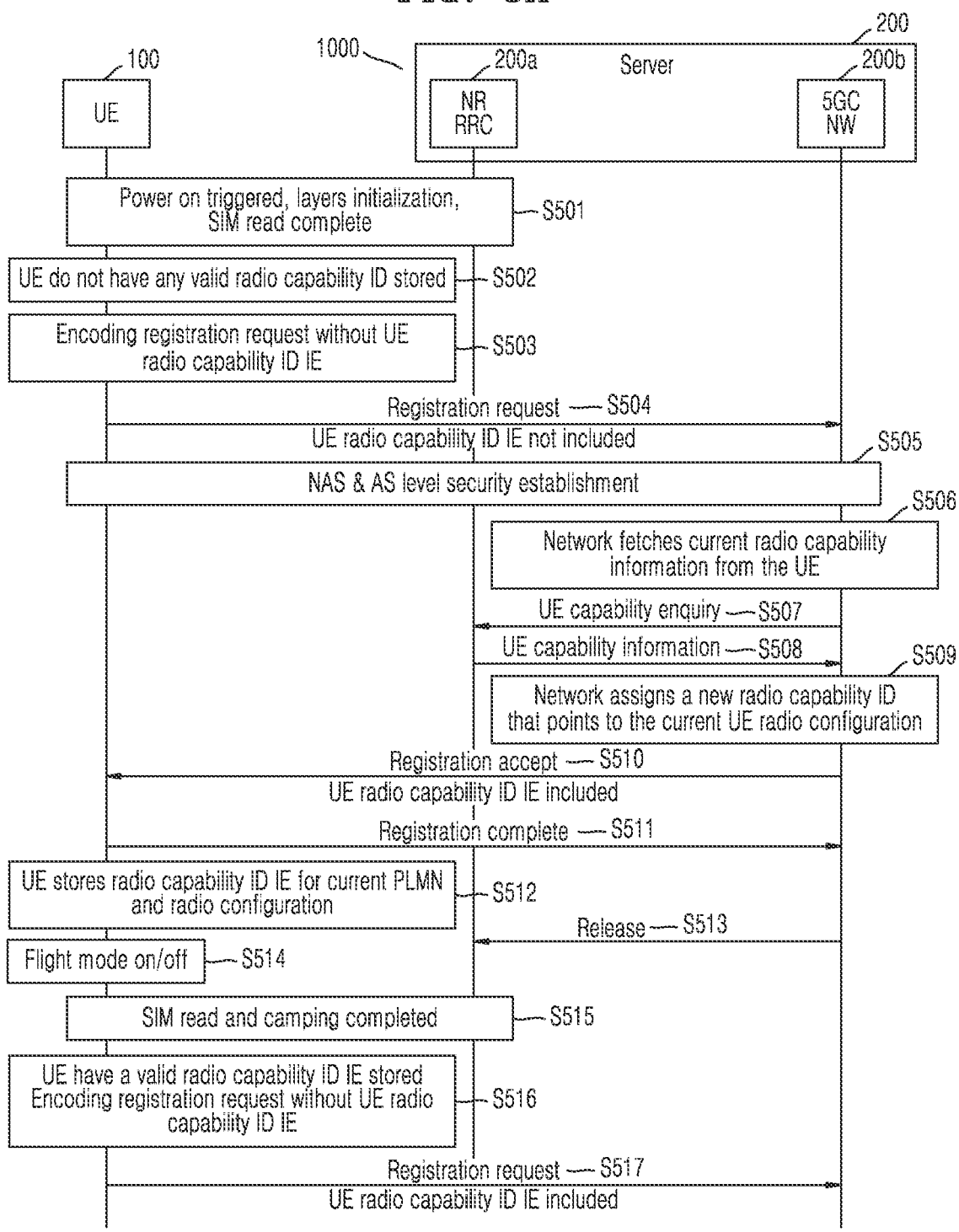
Figure 5B:
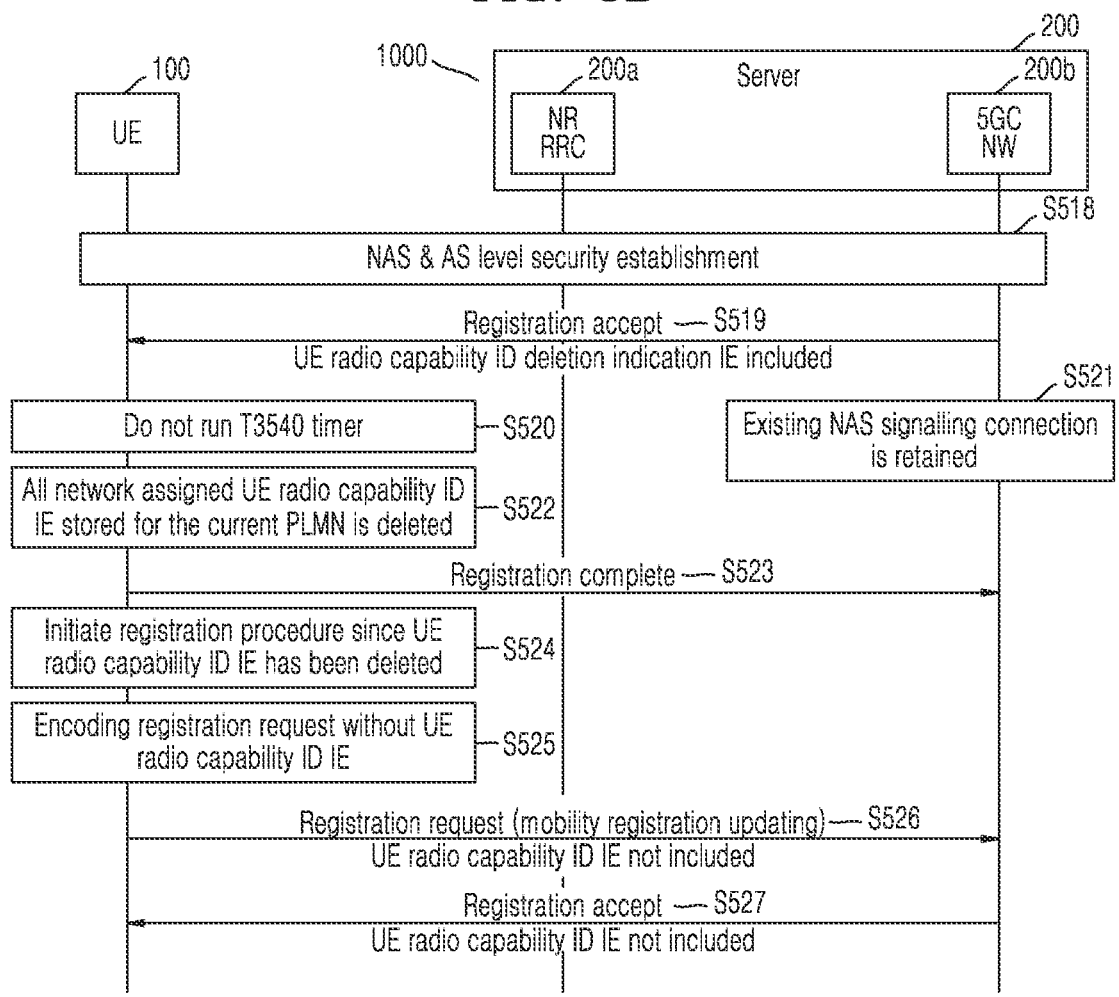

Referring to FIG. 5A and FIG. 5B, at S501, the UE (100) performs initial operations (e.g. power-on, layer initialization, SIM read) to establish a connection with the server (200). At S502-S503, the UE (100) determines that no valid RC_ID_IE is stored in the memory (110) of the UE (100). The UE (100) encodes a registration request message without using the RC_ID_IE. At S504-S505, the UE (100) sends the registration request to the server (20) to establish the NAS signaling between the UE (100) and the server (200), where the registration request message does not comprise the RC_ID_IE. At S506-S509, the server (200) fetches a current RC information and assigns a new RC_ID to a current UE radio configuration. At S510, the server (200) sends a UE RC_ID in an RC_ID_IE to the UE (100) in a registration accept. At S511a, the UE (100) sends a registration complete to the server (200) in response to receiving the registration accept. At S512-S513, the UE (100) stores the UE RC_ID_IE for the current PLMN and current UE radio configuration and releases the connection (NAS and AS connection).

At S514-S515, the UE (100) performs the initial operations again to establish the connection with the server (200). At S516, the UE (100) determines that the valid RC_ID is stored (S212a) in the memory (110) of the UE (100). At S517, the UE (100) sends the UE RC_ID in an RC_ID_IE to the server (200) in the registration request. At S518, the UE (100) establishes the NAS signaling with the server (200). At S519, the server (200) sends a UE RC_ID deletion IE to the UE (100) in the registration accept.

At S520-S522, the UE (100) does not start the timer (i.e. T3540) based on receiving the UE RC_ID deletion IE in the registration accept, and retains the N1 Signaling connection after deletion of the UE RC_ID stored in the UE (100) for the current PLMN. The timer should not be started in the UE (100) so that the UE (100) can immediately initiate the registration procedure on the existing NAS signaling connection. This may help reduce a delay of completing this procedure and saves the resources from both UE (e.g., UE (100)) and the server (200) perspective.

At S524-S525, the UE (100) initiates the registration procedure when the stored UE RC_ID is deleted, and encodes the registration request without the UE RC_ID_IE. At S526, the UE (100) sends the registration request to the server for mobility registration updating, where the registration request message does not comprise the RC_ID_IE. At S527, the server (200) sends the registration accept without using the RC_ID_IE and the UE (100) does not send the registration complete to the server (200).

Figure 6A:
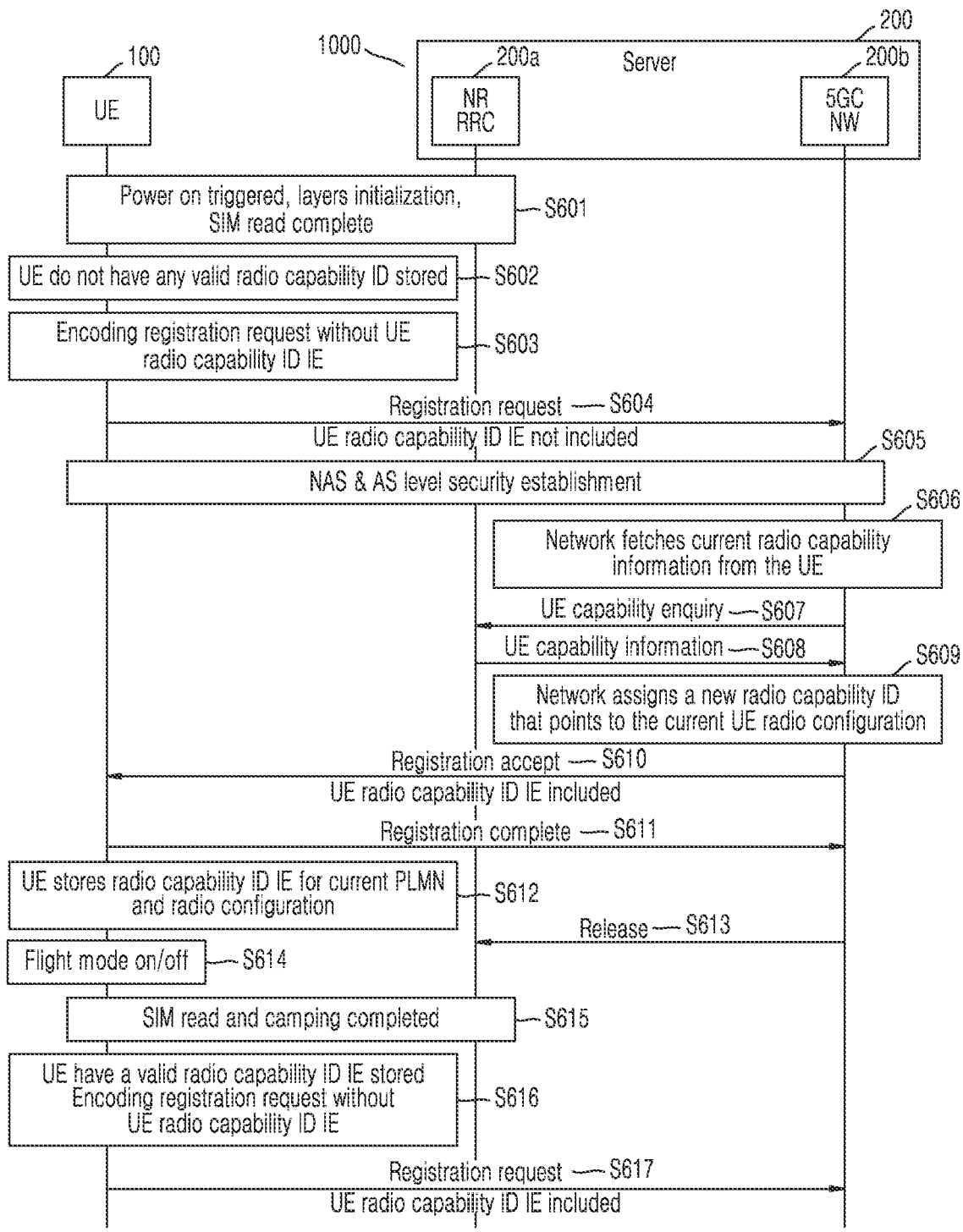
Figure 6B:
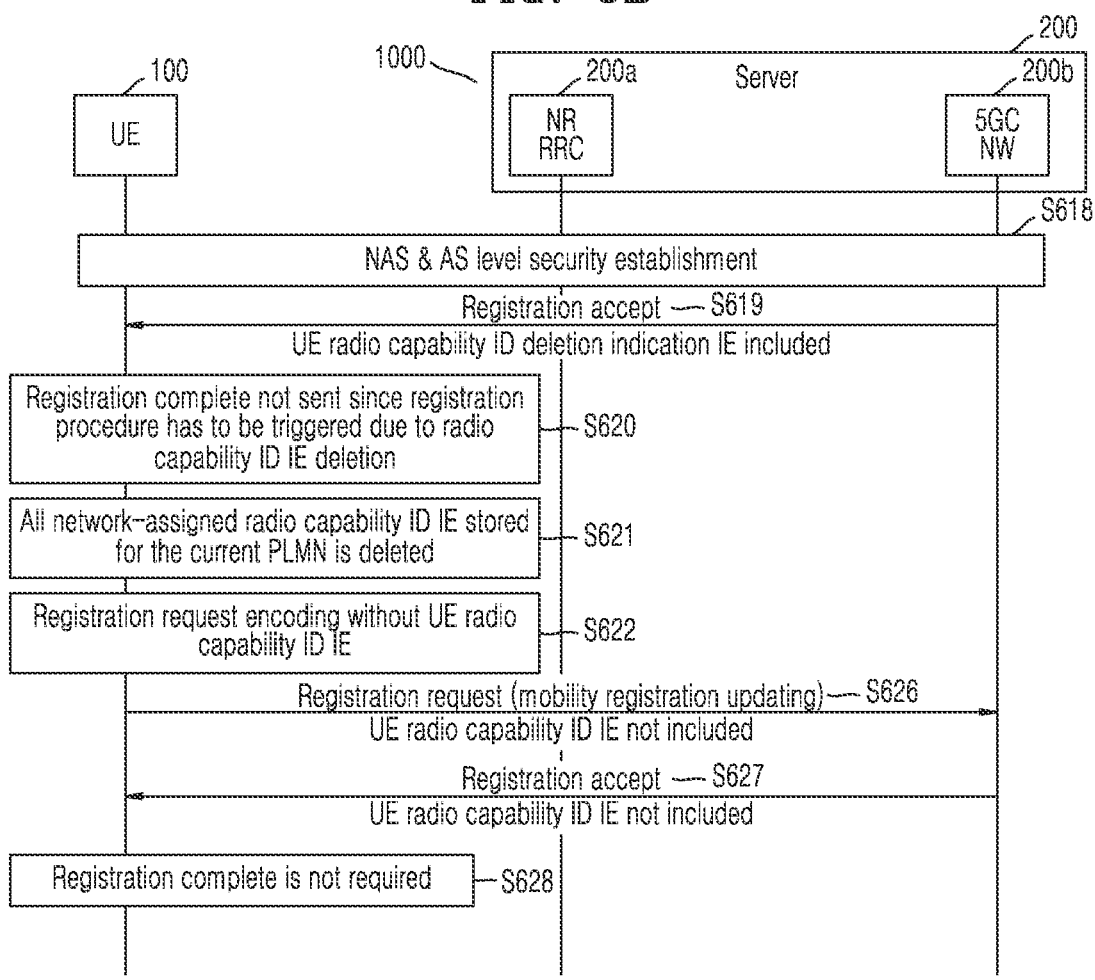

Referring to FIG. 6A and FIG. 6B: at S601, the UE (100) performs initial operations to establish the connection with the server (200). At S602-S603, the UE (100) determines that no valid RC_ID is stored in the memory (110) of the UE (100). The UE (100) encodes the registration request message without using the RC_ID_IE. At S604-S605, the UE (100) sends the registration request to the server (20) to establish the NAS signaling between the UE (100) and the server (200), where the registration request message does not comprise the RC_ID_IE. At S606-S609, the server (200) fetches the current radio capability information and assigns the new RC_ID to this current UE radio capability configuration. At S610, the server (200) sends the UE RC_ID_IE to the UE (100) in the registration accept. At S611, the UE (100) sends the registration complete to the server (200) in response to receiving the registration accept. At S612-S613, the UE (100) stores the UE RC_ID for the current PLMN and current UE radio configuration and release connection.

At S614-S615, the UE (100) performs the initial operations again to establish the connection with the server (200). At S616, the UE (100) determines that the valid RC_ID is stored (S612) in the memory (110) of the UE (100). At S617, the UE (100) sends the UE RC_ID in an RC_ID_IE to the server (200) in the registration request. At S618, the UE (100) establishes the NAS signaling with the server (200). At S619, the server (200) sends the UE RC_ID deletion IE to the UE (100) in the registration accept.

At S620-S628, as a registration procedure is being initiated based on receiving the UE RC_ID deletion IE, the redundant requirement of sending the registration complete message as an acknowledgment to the server (200) may be removed. This will further reduce the signaling exchange between the UE (100) and the server (200). Thus, based on receiving the UE RC_ID deletion IE, the UE (100) can proceed with initiating a registration procedure for mobility after deletion of the applicable UE RC_ID from the memory (110). This enables the server (200) to assign any new UE RC_ID for the UE (100) or to use the manufacturer assigned UE RC_ID already available in the UE (100). Sending the registration complete is not necessary as it does not solve any specific purpose.

Referring to FIG. 7: at S701, the UE (100) performs initial operations to establish the connection with the server (200). At S702-S703, the UE (100) determines that no valid RC_ID is stored in the memory (110) of the UE (100). The UE (100) encodes the registration request message without using the RC_ID_IE. At S704-S705, the UE (100) sends the registration request to the server (200) to establish the NAS signaling between the UE (100) and the server (200), where the registration request message does not comprise the RC_ID_IE. At S706-S709, the server (200) fetches the current radio capability information and assigns the new RC_ID to the current UE radio capability configuration. At S710, the server (200) sends the UE RC_ID in an RC_ID_IE to the UE (100) in the registration accept. At S711, the UE (100) stores the received UE RC_ID_IE for the current PLMN and radio configuration. At S712-S713, the UE (100) sends the registration complete to the server (200) in response to receiving the registration accept and detects that the transmission of the registration complete fails due to cell change into a TA that is not registered in the same PLMN (transmission failure).

At S714-S718, the UE (100) may consider the UE RC_ID received in the registration accept message valid for the current PLMN when a registration procedure is re-initiated due to TAI change or lower layers failures. Since the server (200) would either retransmit the registration accept message or directly enter a registered state in case of any failures in receiving the registration complete message from the UE (100), this approach will not cause any violation from UE (100) and server (200) perspective. Thus, on transmission failure of the registration complete message, the UE (100) shall consider the recently received UE RC_ID as valid and can send the UE RC_ID_IE in the registration request message to the server (200) if it re-initiates the procedure, provided the UE (100) is still in the same PLMN. The server (200) will maintain the UE RC_ID assigned when reception of the registration complete is not possible and when moving to the registered state. This will reduce the signaling interchanged between the the UE (100) and the network when the UE (100) tries to re-initiate the registration procedure.

Figure 8A:
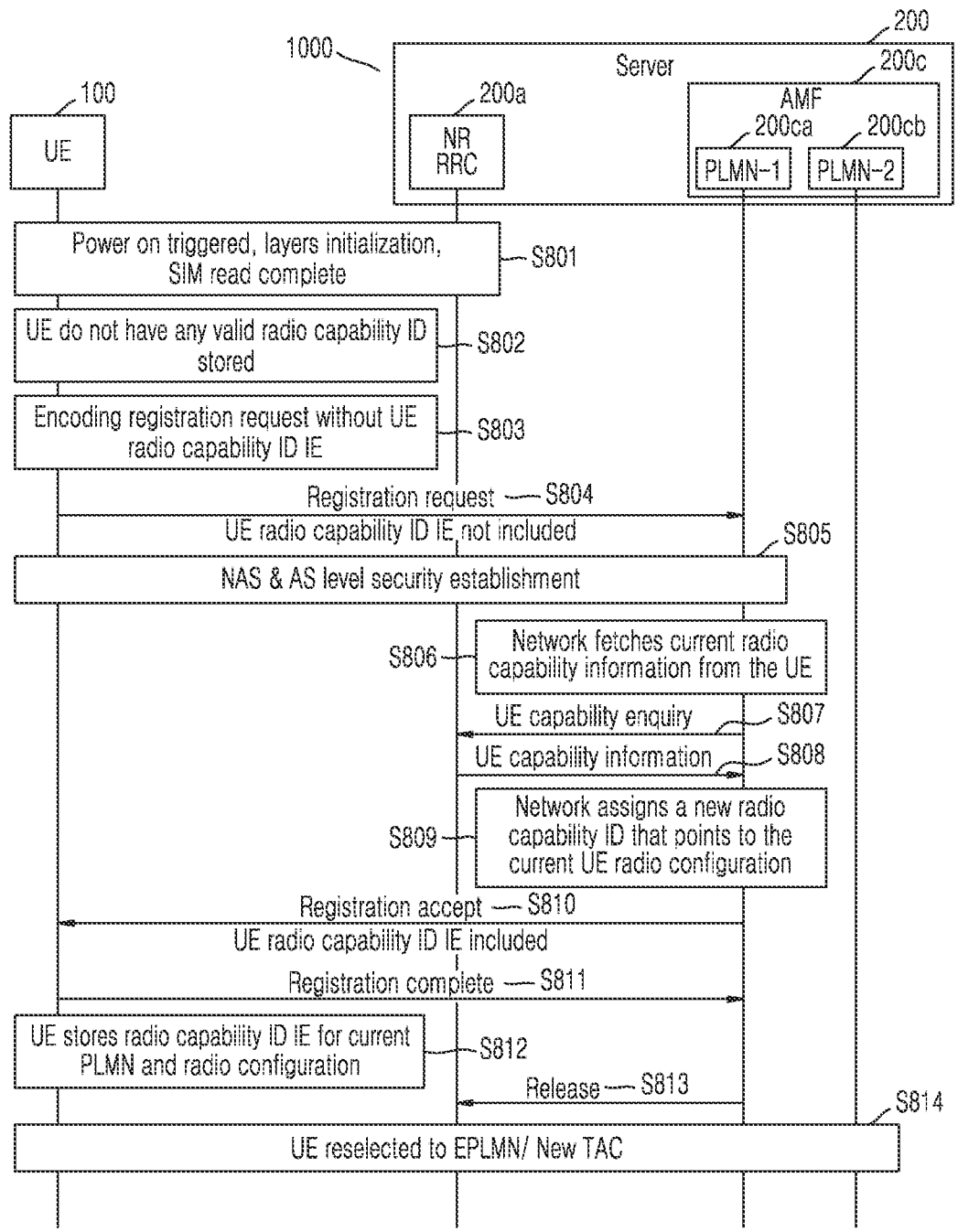
Figure 8B:
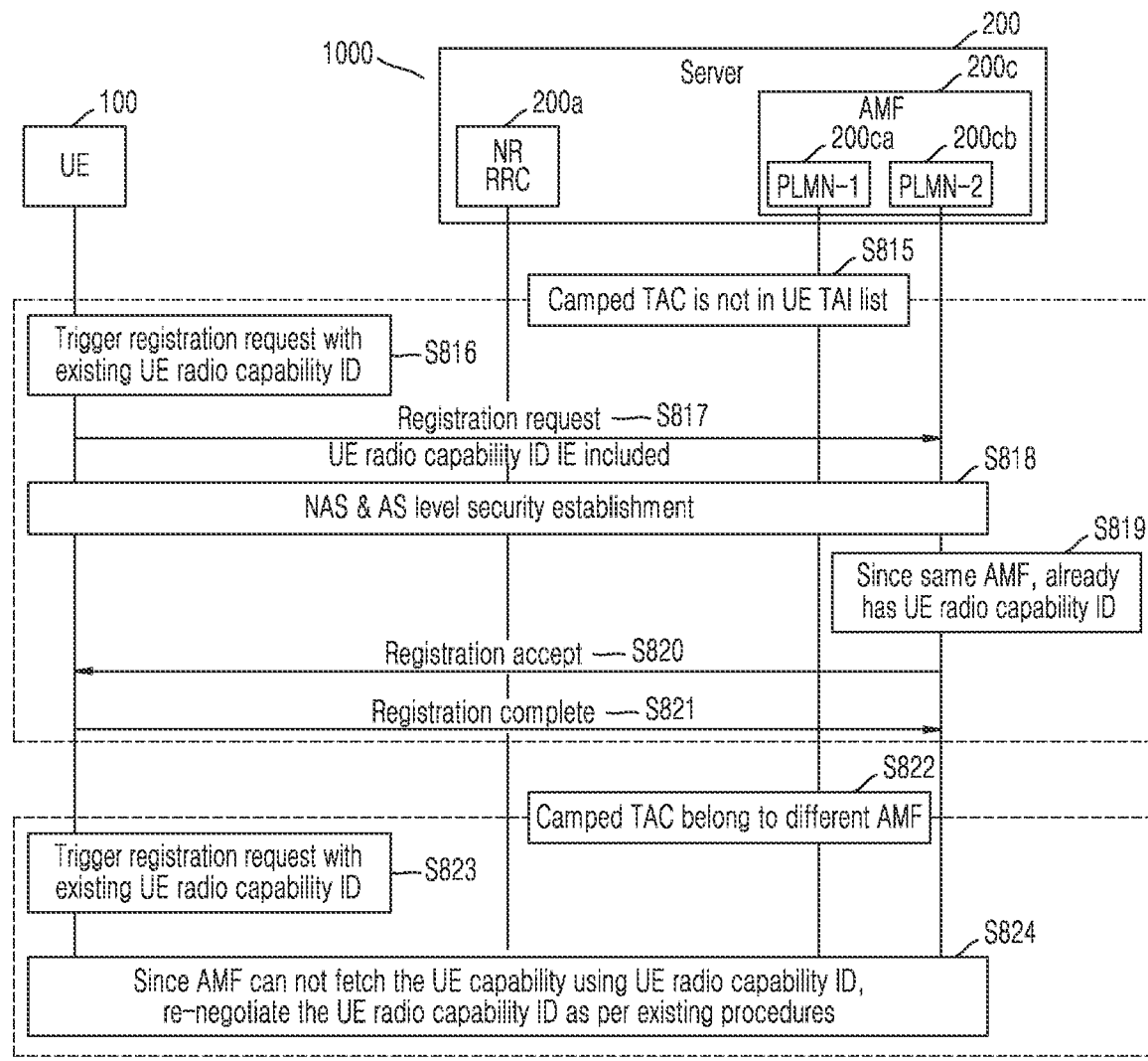

Referring to FIG. 8A and FIG. 8B: at S801, the UE (100) performs initial operations to establish the connection with the server (200). At S802-S803, the UE (100) determines that no valid RC_ID is stored in the memory of the UE (100). The UE (100) encodes the registration request message without using the RC_ID_IE. At S804d-S805d, the UE (100) sends the registration request to the server (200) to establish the NAS signaling between the UE (100) and the server (200), where the registration request message does not comprise the RC_ID_IE. At S806-S809, the server (200) fetches the current radio capability information and assigns the new RC_ID to this current UE radio capability configuration. At S810, the server (200) sends the UE RC_ID in an RC_ID_IE to the UE (100) in the registration accept. At S811-S813, the UE (100) sends the registration complete to the server (200) in response to receiving the registration accept, stores the received UE RC_ID in the memory (110) of the UE (100), and releases the connection. At S814, the UE (100) reselects PLMN/TAC and detects that the reselected PLMN (200cb)/TAC belongs to the same AMF (200c).

At S815-S821, when the TAC is not part of the UE (100)'s TAI list shared by the server (200) in the registration accept, then the UE (100) cannot know whether the camped TAC belongs to same AMF (200c). Hence the UE (100) will use the current valid RC_ID during the registration. If the reselected PLMN (200cb)/TAC belong to the same AMF (200c), then no new RC_ID will be assigned.

At S822-S824, when the AMF is changed then existing procedures of new RC_ID assignment will be followed.

If Radio Access Network (RAN) has changed, the capability will be shared by AMF through N1 interface to the RAN. Thus, in mobility, when the UE (100) moves to a new PLMN or TAC belonging to a same AMF, the UE (100) can avoid sending the registration procedure to renegotiate RC_ID again. This will reduce the signaling interchanged between the UE (100) and the server (200) in mobility scenarios.

As set forth above, embodiments herein provide an ability to retain an NAS signaling connection after deletion of UE RC_IDs stored in a UE for a current PLMN, where the deletion of UE RC_IDs is based on receipt of a registration accept message from a wireless network. Furthermore, a timer T3540 in the UE does not require starting in response to receiving the registration accept message which is the basis of the deletion of UE RC_IDs. As a result, the UE can immediately initiate a registration procedure based on an existing NAS signaling connection. This may help reduce a delay of completing the registration procedure and saves radio resources associated with the UE and the wireless network.

Also as set forth above, a redundant requirement of sending a registration complete message as an acknowledgement to the wireless network after receiving the registration accept message with the deletion of UE RC_IDs from the wireless network is removed. This may help reduce signaling overhead in both the UE and the wireless network.

As further set forth above, UE RC_IDs received in the registration accept message may be considered valid for the current PLMN when the registration procedure is re-initiated due to TAI change or lower layers failures or registration complete failure. This may help reduce signaling interchanged between the UE and the wireless network when the UE tries to re-initiate the registration procedure.

As moreover set forth above, whether a newly camped TAC is part of the UE's TAI list received in the registration accept message may be determined. The UE uses the same RC_IDs received in the registration accept message when the newly camped TAC is not in the UE's TAI list. If AMF/MME is the same then no new UE RC_IDs will be assigned. If AMF/MME is changed then the existing procedure of new UE RC_ID assignment will be followed. This may help reduce signaling interchanged between the UE and the wireless network in mobility scenarios.

The embodiments disclosed herein can be implemented using at least one hardware device and performing network management functions to control the elements.

The foregoing description of the specific embodiments will so fully reveal the general nature of the embodiments herein that others can, by applying current knowledge, readily modify and/or adapt for various applications the specific embodiments without departing from the generic concept. Therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the scope of the embodiments as described herein.

We claim:

1. A method for enhancing NAS (non-access stratum) signaling in RACS (radio capability signaling optimization) of a wireless network, the method comprising:
receiving, by a UE (user equipment), an RC_ID_IE (radio capability identity information element) with an RC_ID (radio capability identity) from a server of the wireless network to optimize a transmission of the UE;
sending, by the UE, a registration request message to the server to establish NAS signaling between the UE and the server;
establishing, by the UE, the NAS signaling between the UE and the server; and
enhancing, by the UE, the NAS signaling between the UE and the server by performing at least one of:
receiving a registration accept message with an RC_ID deletion IE (radio capability identity deletion information element) from the server, and sending a registration complete message to the server using existing NAS signaling and without starting a release timer in response to receiving the RC_ID deletion IE in the registration accept message; and
receiving the registration accept message with the RC_ID deletion IE from the server and not sending the registration complete message to the server in response to receiving the RC_ID deletion IE in the registration accept message.

2. The method as claimed in claim 1, further comprising:
mandatorily initiating, by the UE, a registration procedure for mobility in a connected mode and using an existing NAS signaling connection after receiving the RC_ID deletion IE in the registration accept message, wherein the registration procedure for mobility in the connected mode reduces NAS signaling latency and usage of radio resources between the UE and the server.

3. The method as claimed in claim 1, wherein receiving, by the UE, the RC_ID in the RC_ID_IE from the server of the wireless network to optimize the transmission of the UE comprises:
determining, by the UE, that the RC_ID is not stored in the UE;
encoding, by the UE, the registration request message without using the RC_ID_IE;
sending, by the UE, the registration request message to the server to establish the NAS signaling between the UE and the server, wherein the registration request message does not comprise the RC_ID_IE; and
receiving, by the UE, the registration accept message from the server, wherein the registration accept message comprises the RC_ID in the RC_ID_IE.

4. The method as claimed in claim 3, further comprising:
performing, by the UE, one of:
storing the received RC_ID in the UE and then sending the registration complete message to the server;
sending the registration complete message to the server and then storing the received RC_ID in the UE;
storing the received RC_ID in the UE and then reinitiating a registration procedure due to at least one of change in a TAI (tracking area identity) and lower layers failures or transmission failure of the registration complete message to the server; and
sending the registration complete message to the server, then storing the received RC_ID in the UE, and then reinitiating the registration procedure based on a TAC change (tracking area code change) in a serving PLMN (public land mobile network) of the wireless network.

5. The method as claimed in claim 4, wherein reinitiating the registration procedure due to the at least one of change in the TAI and the lower layers failures comprises:
detecting, by the UE, that the registration complete message is not received at the server;
retaining, by the UE, the stored RC_ID; and
reinitiating, by the UE, the registration procedure by using the retained RC_ID in an RC_ID_IE in a registration request message.

6. The method as claimed in claim 4, wherein reinitiating the registration procedure based on the TAC change in the serving PLMN comprises:
determining, by the UE, whether the TAC is associated with the TAI and the serving PLMN is associated with the server, wherein the TAI is received in the registration accept message from the server; and
performing, by the UE, one of:
triggering the registration procedure using the stored RC_ID in response to determining that the TAC is not associated with the TAI and the serving PLMN is associated with the server; and
reinitiating the registration procedure using the stored RC_ID in response to determining that the TAC is not associated with the TAI and the serving PLMN is not associated with the server.

7. The method as claimed in claim 1, wherein the RC_ID comprises a set of radio capabilities of the UE, wherein the RC_ID_IE is used as an alternative to an AS signaling message in the wireless network, and wherein the RC_ID is allocated using the server of the wireless network during a registration procedure or comprises a manufacturer RC_ID stored in the UE by an OEM (original equipment manufacturer).

8. The method as claimed in claim 7, wherein the RC_ID of the UE is updated through an OMA (open mobile alliance) DM (device management) of the wireless network, and wherein the allocated RC_ID is only applicable to a current radio configuration of the UE and is usable in all PLMNs.

9. The method as claimed in claim 1, further comprising:
deleting, by the UE, all stored RC_IDs allocated by the server and associated with a serving PLMN (public land mobile network) of the wireless network based on receiving the RC_ID deletion IE in the registration accept message.

10. A UE (user equipment) for enhancing NAS (non-access stratum) signaling in a RACS (radio capability signaling optimization) of a wireless network, the UE comprising:
a memory;
a processor; and
an NAS signaling controller, operably connected to the memory and the processor, and configured to:
receive an RC_ID_IE (radio capability identity information element) with an RC_ID (radio capability identity) from a server of the wireless network to optimize a transmission of the UE;
send a registration request message to the server to establish NAS signaling between the UE and the server;
establish the NAS signaling between the UE and the server; and
enhance the NAS signaling between the UE and the server by performing at least one of:

receiving a registration accept message with an RC_ID deletion IE (radio capability identity deletion information element) from the server, and sending a registration complete message to the server using existing NAS signaling and without starting a release timer in response to receiving the RC_ID deletion IE in the registration accept message; and receiving the registration accept message with the RC_ID deletion IE from the server and not sending the registration complete message to the server in response to receiving the RC_ID deletion IE in the registration accept message.

11. The UE as claimed in claim 10, wherein the UE is configured to perform:

mandatorily initiating, by the UE, a registration procedure for mobility in a connected mode and using an existing NAS signaling connection after receiving the RC_ID deletion IE in the registration accept message, wherein the registration procedure for mobility in the connected mode reduces NAS signaling latency and usage of radio resources between the UE and the server.

12. The UE as claimed in claim 10, wherein receiving the RC_ID in the RC_ID_IE from the server of the wireless network to optimize the transmission of the UE comprises:

determining that the RC_ID is not stored in the UE;

encoding the registration request message without using the RC_ID_IE;

sending the registration request message to the server to establish the NAS signaling between the UE and the server, wherein the registration request message does not comprise the RC_ID_IE; and receiving the registration accept message from the server, wherein the registration accept message comprises the RC_ID in the RC_ID_IE.

13. The UE as claimed in claim 12, wherein the UE is configured to perform one of:

storing the received RC_ID in the UE and then sending the registration complete message to the server;

sending the registration complete message to the server and then storing the received RC_ID in the UE;

storing the received RC_ID in the UE and then reinitiating a registration procedure due to at least one of change in a TAI (tracking area identity) and lower layers failures or transmission failure of the registration complete message to the server; and sending the registration complete message to the server, then storing the received RC_ID in the UE, and then reinitiating the registration procedure based on a TAC change (tracking area code change) in a serving PLMN (public land mobile network) of the wireless network.

14. The UE as claimed in claim 13, wherein reinitiating the registration procedure due to the at least one of change in the TAI and the lower layers failures comprises:

detecting, by the UE, that the registration complete message is not received at the server;

retaining, by the UE, the stored RC_ID; and reinitiating, by the UE, the registration procedure by using the retained RC_ID in an RC_ID_IE of the registration request message.

15. The UE as claimed in claim 13, wherein reinitiating the registration procedure based on the TAC change in the serving PLMN comprises:

determining whether the TAC is associated with the TAI and the serving PLMN is associated with the server, wherein the TAI is received in the registration accept message from the server; and performing one of:

triggering the registration procedure using the stored RC_ID in response to determining that the TAC is not associated with the TAI and the serving PLMN is associated with the server; and reinitiating the registration procedure using the stored RC_ID in response to determining that the TAC is not associated with the TAI and the serving PLMN is not associated with the server.

16. The UE as claimed in claim 10, wherein the RC_ID comprises a set of radio capabilities of the UE, wherein the RC_ID is used as an alternative to an AS signaling message in the wireless network, and wherein the RC_ID is allocated by the server of the wireless network during a registration procedure or comprises a manufacturer RC_ID stored in the UE by an OEM (original equipment manufacturer).

17. The UE as claimed in claim 16, wherein the RC_ID of the UE is updated through an OMA (open mobile alliance) DM (device management) of the wireless network, and wherein the allocated RC_ID is only applicable to a current radio configuration of the UE and is usable in all PLMNs.

18. The UE as claimed in claim 10, wherein the UE deletes all stored RC_ID allocated by the server and associated with a serving PLMN (public land mobile network) of the wireless network based on receiving the RC_ID deletion IE in the registration accept message.

* * * * *